(12) United States Patent
Momose et al.

(10) Patent No.: US 7,815,315 B2
(45) Date of Patent: Oct. 19, 2010

(54) COOLING DEVICE AND PROJECTOR

(75) Inventors: Yasunaga Momose, Tatsuno-machi (JP); Yoshiyuki Yanagisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 784 days.

(21) Appl. No.: 11/808,493

(22) Filed: Jun. 11, 2007

(65) Prior Publication Data

US 2007/0291234 A1    Dec. 20, 2007

(30) Foreign Application Priority Data

Jun. 15, 2006    (JP) ............................. 2006-166314

(51) Int. Cl.
- G03B 21/16 (2006.01)
- H05K 21/16 (2006.01)
- F25B 21/02 (2006.01)

(52) U.S. Cl. .......................... 353/52; 353/57; 361/676; 361/679.46; 361/649.54; 361/688; 61/3.2

(58) Field of Classification Search .................. 353/52, 353/55, 56, 57, 58, 60, 61; 361/676, 678, 361/679.46, 679.47, 679.48, 679.5, 679.54, 361/688, 697, 703, 709, 710; 61/3.2

See application file for complete search history.

(56) References Cited

U.S. PATENT DOCUMENTS

| | | | |
|---|---|---|---|
| 5,740,013 A * | 4/1998 | Roesner et al. | 361/697 |
| 5,813,233 A | 9/1998 | Okuda et al. | |
| 6,428,170 B1 | 8/2002 | Haba | |
| 6,834,964 B2 * | 12/2004 | Nishihara et al. | 353/52 |
| 6,967,839 B2 * | 11/2005 | Chung et al. | 361/695 |
| 7,151,670 B2 * | 12/2006 | Rogers et al. | 361/709 |
| 7,188,956 B2 * | 3/2007 | Otsuka et al. | 353/52 |
| 7,275,833 B2 * | 10/2007 | Saito | 353/52 |
| 2003/0154598 A1 * | 8/2003 | Shinotou | 29/834 |
| 2004/0083740 A1 * | 5/2004 | Taban | 62/3.2 |
| 2004/0125566 A1 * | 7/2004 | Lee et al. | 361/707 |
| 2005/0111190 A1 * | 5/2005 | Wang et al. | 361/704 |
| 2005/0264766 A1 * | 12/2005 | Morimoto et al. | 353/61 |
| 2009/0086171 A1 * | 4/2009 | Sun | 353/52 |
| 2009/0153805 A1 * | 6/2009 | Li et al. | 353/57 |

(Continued)

FOREIGN PATENT DOCUMENTS

JP    A-9-185028    7/1997

(Continued)

*Primary Examiner*—William C Dowling
(74) *Attorney, Agent, or Firm*—Oliff & Berridge, PLC

(57) ABSTRACT

A cooling device with a thermoelectric conversion element having a heat absorbing surface and a heat releasing surface includes: a heat-absorbing-side heat conductive member connected with the heat absorbing surface in a heat-conductive manner; a heat-releasing-side heat conductive member connected with the heat releasing surface in a heat-conductive manner; a plurality of heat-absorbing-side fin members that is disposed to the heat-absorbing-side heat conductive member, protrudes in an out-of-plane direction from an end surface remote from the heat absorbing surface and extends in a predetermined direction; and a plurality of heat-releasing-side fin members that is disposed to the heat-releasing-side heat conductive member, protrudes in an out-of-plane direction from an end surface remote from the heat releasing surface and extends in a predetermined direction intersecting with the plurality of heat-absorbing-side fin members in plan view.

16 Claims, 24 Drawing Sheets

U.S. PATENT DOCUMENTS

2010/0110391 A1* 5/2010 Chu et al. .................... 353/52

FOREIGN PATENT DOCUMENTS

| | | |
|---|---|---|
| JP | A-2000-298311 | 10/2000 |
| JP | B2-3212818 | 7/2001 |
| JP | A-2001-355937 | 12/2001 |
| JP | A-2004-109731 | 4/2004 |
| JP | B2-3638256 | 1/2005 |
| JP | A-2005-121712 | 5/2005 |

* cited by examiner

COOLING DEVICE AND PROJECTOR

The entire disclosure of Japanese Patent Application No. 2006-166314, filed Jun. 15, 2006, is expressly incorporated by reference herein.

BACKGROUND

1. Technical Field

The present invention relates to a cooling device and a projector.

2. Related Art

There has been known a projector that includes a light source device, an optical modulator that modulates a light beam irradiated from the light source device in accordance with image information to form an optical image; and a projection optical device that projects the optical image in an enlarged manner.

In the projector, when dust, lamp black or the like is attached on a surface of the optical modulator, image quality of a projected image is deteriorated. In addition, since the optical modulator such as a liquid crystal panel is generally heat-sensitive, the optical modulator may be deteriorated due to heat caused by irradiation of a light beam from the light source device.

Accordingly, to ensure stable image quality of the projected image and to efficiently cool the optical modulator, an arrangement has been suggested in which the optical modulator is disposed in a sealed structure, air in the sealed structure is circulated by a circulation fan, and heat in the air in the sealed structure is released to the outside of the sealed structure by a cooling device that uses a thermoelectric conversion element such as a peltiert element (see, for example, Document: JP-A-2000-298311).

The cooling device described in the document includes: a thermoelectric conversion element; two heat transfer members sandwiching and holding the thermoelectric conversion element; and a cooling fan for cooling a heat transfer member disposed on a heat releasing side. The heat transfer member disposed in the sealed structure out of the two transfer members is formed with a plate member made from aluminum having heat transfer property. The heat transfer member disposed outside the sealed structure is formed with a heat releasing fin made from aluminum having heat transfer property.

In the arrangement, since a surface area of the heat transfer member disposed in the sealed structure is comparatively small, it is difficult that the heat in the air in the sealed structure is appropriately absorbed by the heat transfer member. In other words, a heat absorption amount transferred to a heat absorbing surface of the thermoelectric conversion element via the heat transfer member is comparatively small, so that it is difficult to enhance a ratio of a heat absorption amount of heat absorbed from a to-be-cooled object (the air in the sealed structure) to an electric power consumption of the cooling device (the heat absorption efficiency).

SUMMARY

An advantage of some aspects of the invention is to provide a cooling device and a projector which have an enhanced heat absorption efficiency.

A cooling device according to an aspect of the invention is a cooling device including a thermoelectric conversion element that has a heat absorbing surface and a heat releasing surface. The cooling device includes: a heat-absorbing-side heat conductive member connected with the heat absorbing surface in a heat-conductive manner; a heat-releasing-side heat conductive member connected with the heat releasing surface in a heat-conductive manner; a plurality of heat-absorbing-side fin members that is disposed to the heat-absorbing-side heat conductive member, protrudes in an out-of-plane direction from an end surface remote from the heat absorbing surface and extends in a predetermined direction; and a plurality of heat-releasing-side fin members that is disposed to the heat-releasing-side heat conductive member, protrudes in an out-of-plane direction from an end surface remote from the heat releasing surface and extends in a predetermined direction intersecting with the plurality of heat-absorbing-side fin members in plan view.

According to an aspect of the invention, since the heat-absorbing-side heat conductive member is connected with the heat absorbing surface of the thermoelectric conversion element in a heat conductive manner and the heat-absorbing-side heat conductive member is provided with the plurality of heat-absorbing-side fin members, a surface area of the heat-absorbing-side heat conductive member can be large compared with that of a related-art plate-like heat transfer member. Hence, the heat absorption amount of heat that is transferred from a to-be-cooled object via the heat-absorbing-side heat conductive member to the heat absorbing surface of the thermoelectric conversion element can be comparatively large, thereby enhancing the heat absorption efficiency of the cooling device.

For example, when the heat-releasing-side heat conductive member in the cooling device is cooled by the cooling fan, it is possible to enhance the heat absorption efficiency. Accordingly, it is not needed to unnecessarily increase the rotation speed of the cooling fan, thereby contributing to noise reduction. In addition, power consumption of the thermoelectric conversion element needs not be unnecessarily increased, thereby contributing to power-saving of the projector.

Note that when air speed varies among the plurality of heat-absorbing-side fin members, in the heat-absorbing-side heat conductive member, an amount of heat absorbed from the air flowing between two fin members out of the plurality of heat-absorbing-side fin members may be larger than that between other two fin members. In other words, an amount of heat that can be absorbed varies depending on the plurality of heat-absorbing-side fin members.

Similarly, when air speed varies among the plurality of heat-releasing-side fin members, in the heat-releasing-side heat conductive member, an amount of heat released from the air flowing between two fin members out of the plurality of heat-releasing-side fin members may be larger than that between other two fin members. In other words, an amount of heat that can be released varies depending on the plurality of heat-releasing-side fin members.

When the extending direction of the plurality of heat-absorbing-side fin members is set to the same as that of the plurality of heat-releasing-side fin member, the large heat-absorption-amount portions of the heat-absorbing-side heat conductive member may not be planarly superposed with the large heat-releasing-amount portions of the heat-releasing-side heat conductive member. In such a case, heat is transferred from a large heat-absorption-amount portion of the heat-absorbing-side heat conductive member to a small heat-releasing-amount portion in the heat-releasing-side heat conductive member, so that sufficient heat absorption efficiency can not be ensured in the cooling device.

In the aspect of the invention, the extending direction of the plurality of heat-absorbing-side fin members is orthogonal in plan view to that of the plurality of heat-releasing-side fin member. Thus, even in the above-described case, it is possible to superpose at least a part of the large heat-absorption-amount portion of the heat-absorbing-side heat conductive member on at least a part of the large heat-releasing-amount portion in the heat-releasing-side heat conductive member. Hence, heat is transferred from the large heat-absorption-amount portion of the heat-absorbing-side heat conductive member to the small heat-releasing-amount portion in the heat-releasing-side heat conductive member, so that sufficient heat absorption efficiency can be ensured in the cooling device.

In the cooling device according to the aspect of the invention, the plurality of heat-releasing-side fin members may extend in a predetermined direction orthogonal to the plurality of heat-absorbing-side fin members in plan view.

According to the aspect of the invention, the plurality of heat-absorbing-side fin members and the plurality of heat-releasing-side fin members extend so as to orthogonally intersect with each other. Hence, even in the above-described case, it is possible to superpose at least a part of the large heat-absorption-amount portion of the heat-absorbing-side heat conductive member on at least a part of the large heat-releasing-amount portion in the heat-releasing-side heat conductive member. Hence, heat is transferred from the large heat-absorption-amount portion of the heat-absorbing-side heat conductive member to the small heat-releasing-amount portion in the heat-releasing-side heat conductive member, so that sufficient heat absorption efficiency can be ensured in the cooling device, which is one advantage.

The cooling device according to the aspect of the invention may further include a spacer that has heat conductive property and is interposed between the heat-absorbing-side heat conductive member and the heat absorbing surface.

Note that the thermoelectric conversion element is generally adapted to have a thin thickness of about 4 mm with the thermoelectric conversion performance taken into consideration. When the heat-absorbing-side heat conductive member and the heat-releasing-side heat conductive member are directly attached to the heat absorbing surface and the heat releasing surface, the heat-absorbing-side heat conductive member is close to the heat-releasing-side heat conductive member, so that heat of the heat-releasing-side heat conductive member is easily transferred to the heat-absorbing-side heat conductive member. Hence, the heat-absorbing-side fin members absorb less heat from the air (to-be-cooled object), so that sufficient heat absorption efficiency can not be ensured in the cooling device.

In the aspect of the invention, since the spacer having heat conductive property is interposed between the heat-absorbing-side heat conductive member and the heat absorbing surface, a predetermined distance can be ensured between the heat-absorbing-side heat conductive member and the heat-releasing-side heat conductive member. Hence, heat transfer from the heat-releasing-side heat conductive member to the heat-absorbing-side heat conductive member can be restrained, so that a heat absorption amount by which the heat-absorbing-side fin members absorbs heat from the air (the to-be-cooled object) can be maintained and sufficient heat absorption efficiency can be ensured in the cooling device.

In order to ensure the predetermined distance between the heat-absorbing-side heat conductive member and the heat-releasing-side heat conductive member, another arrangement might be conceived in which the spacer is interposed between the heat-releasing-side heat conductive member and the thermoelectric conversion element. However, such an arrangement may cause following problems.

It is generally known that the heat absorption efficiency becomes better when a difference in temperature between the heat releasing surface and the heat absorbing surface of the thermoelectric conversion element is small. In addition, generally, when a heat absorption amount absorbed by the heat absorbing surface is defined as $Q_{ab}$, a heat releasing amount released from the heat releasing surface $Q_D$ equals to $Q_{ab}+P$ because electric power (consumption power) P that is supplied to the thermoelectric conversion element is added. Accordingly, a transmitting heat amount of the heat absorption side is only $Q_{ab}$, but a transmitting heat amount on the heat releasing side will be a large amount of $Q_{ab}+P$. Hence, when the spacer having a predetermined heat resistance is interposed between the heat-releasing-side heat conductive member and the heat releasing surface, the temperature of the heat releasing surface becomes large, so that it is difficult to maintain the temperature difference between the heat releasing surface and the heat absorbing surface small. In other words, it is difficult to enhance the heat absorption efficiency.

In the aspect of the invention, the spacer is interposed between the heat-absorbing-side heat conductive member and the heat absorbing surface. Hence, in comparison with the above-described arrangement, since the temperature of the heat releasing surface does not increase, the temperature difference between the heat releasing surface and the heat absorbing surface can be small, thereby enhancing the heat absorption efficiency.

The cooling device according to the aspect of the invention may further include: a heat-transfer inhibiting member that is interposed between the heat-absorbing-side heat conductive member and the heat-releasing-side heat conductive member, the heat-transfer inhibiting member holding the spacer and the thermoelectric conversion element. The heat-transfer inhibiting member may be formed of a material having a heat conductivity equal to or smaller than 0.9 W/(m·K). The heat-transfer inhibiting member may include: a dented portion that is dented toward a heat-releasing-side heat conductive member side and enables the spacer to be accommodated; and an opening portion that is formed in a bottom surface portion of the dented portion and enables the thermoelectric conversion element to be accommodated. The dented portion may be formed so as to cover outer end portions of the spacer and the thermoelectric conversion element.

According to the aspect of the invention, in the cooling device, the heat-transfer inhibiting member formed of a low-heat-conductive material having a sufficiently low heat conductivity is interposed between the heat-absorbing-side heat conductive member and the heat-releasing-side heat conductive member. Hence, in addition to that the spacer can ensure the predetermined distance between the heat-absorbing-side heat conductive member and the heat-releasing-side heat conductive member, heat can be restrained from transferring from the heat-releasing-side heat conductive member to the heat-absorbing-side heat conductive member. Hence, the heat absorption amount of heat that is absorbed from the air (the to-be-cooled object) by the heat-absorbing-side fin members can be appropriately maintained, so that sufficient heat absorption efficiency can be ensured in the cooling device.

Further, since the heat-transfer inhibiting member is formed so as to cover the outer end portions of both of the spacer and thermoelectric conversion element, heat of the heat-releasing-side heat conductive member can be restrained from transferring to the spacer or the thermoelectric conversion element. Hence, the heat absorption amount of heat that is absorbed from the air (the to-be-cooled object) via the heat-absorbing-side fin member and the spacer to the heat absorbing surface can be appropriately maintained, so that sufficient heat absorption efficiency can be ensured in the cooling device.

The cooling device according to the aspect of the invention may further includes a heat-absorbing-side duct that encloses the plurality of heat-absorbing-side fin members, extends in an extending direction of the plurality of heat-absorbing-side fin members and enables air to flow in the extending direction. The heat-absorbing-side duct may be formed of a material having a heat conductivity equal to or smaller than 0.9 W/(m·K).

According to the aspect of the invention, since the cooling device is provided with the heat-absorbing-side duct formed of the above-described low-heat-conductive material having a sufficiently low heat conductivity, heat in air or heat in a component outside the heat-absorbing-side duct can be restrained from transferring via the heat-absorbing-side duct to the air (the to-be-cooled object) in the heat-absorbing-side duct. Accordingly, the cooling device can sufficiently cool the air (the to-be-cooled object) in the heat-absorbing-side duct.

The cooling device according to the aspect of the invention may further include a heat-releasing-side duct that encloses the plurality of heat-releasing-side fin members, extends in an extending direction of the plurality of heat-releasing-side fin members and enables air to flow in the extending direction. The heat-releasing-side duct is formed of a material having a heat conductivity equal to or larger than 42 W/(m·K).

According to the aspect of the invention, since the cooling device is provided with the heat-releasing-side duct formed of the above-described high-heat-conductive material having a sufficiently high heat conductivity, heat transferred from the heat-releasing-side fin member to the air in the heat-releasing-side duct can be released via the heat-releasing-side duct to the outside. Hence, the heat releasing property of the heat-releasing-side fin member can be appropriate. For example, when the heat-releasing-side heat conductive member in the cooling device is cooled by the cooling fan, it is possible to enhance the heat absorption efficiency. Accordingly, it is not needed to unnecessarily increase the rotation speed of the cooling fan, thereby contributing to noise reduction.

In the cooling device according to the aspect of the invention, the heat-absorbing-side heat conductive member and the heat-releasing-side heat conductive member may satisfy a relationship of $A_1:A_2=Q_{ab}:Q_D$, where: $A_1$ is a surface area of the heat-absorbing-side heat conductive member; $A_2$ is a surface area of the heat-releasing-side heat conductive member; $Q_{ab}$ is a heat absorption amount of the thermoelectric conversion element; and $Q_D$ is a heat absorption amount of the thermoelectric conversion element.

$$A_1:A_1:A_2=Q_{ab}:Q_D \quad (1)$$

As described above, the heat releasing amount $Q_D$ from the heat releasing surface is obtained by adding a supplied electric power (the power consumption) P that is provided to the thermoelectric conversion element to the heat absorption amount $Q_{ab}$ of the heat absorbing surface. The heat releasing amount $Q_D$ is larger than the heat absorption amount $Q_{ab}$. Accordingly, for example, when the surface area of the heat-absorbing-side heat conductive member is set larger than that of the heat-releasing-side heat conductive member, it is difficult to appropriately release a comparatively large heat releasing amount $Q_D$ from the heat releasing surface via the heat-releasing-side heat conductive member to the outside air. In such a case, for example, it is necessary to increase the rotation speed of the cooling fan cooling the heat-releasing-side heat conductive member, which obstructing noise reduction of the projector.

In the aspect of the invention, since the heat-absorbing-side heat conductive member and the heat-releasing-side heat conductive member are adapted to satisfy the relationship of the expression (1), a comparatively large heat releasing amount $Q_D$ can be released from the heat releasing surface via the heat-releasing-side heat conductive member to the outside air. Hence, for example, the rotational speed of the cooling fan that cools the heat-releasing-side heat conductive member needs not be unnecessarily increased, thereby contributing to noise-reduction of the projector.

The cooling device according to the aspect of the invention may further include a cooling fan that is disposed so as to face the heat-releasing-side heat conductive member and sends air to the plurality of heat-releasing-side fin members. The cooling fan may be an axial-flow fan that sucks and ejects air in a direction of a fan rotation axis. The fan rotation axis may be displaced relative to a center position of the thermoelectric conversion element in plan view.

Note that, in the axial-flow fan, the air speed of the ejected air is larger on tip end sides of the plurality of vanes of the fan than that on the fan rotation axis.

In the aspect of the invention, the cooling fan is disposed such that the rotation axis of the fan is displaced from a center position of the thermoelectric conversion element in plan view. Accordingly, in the heat-releasing-side heat conductive member, the thermoelectric conversion element is disposed on a portion onto which the air ejected from the cooling fan is blown, the air having a large speed. Hence, in the heat-releasing-side heat conductive member, the cooling fan can efficiently cool a portion that is heated to a high temperature by the heat transferred from the heat releasing surface of the thermoelectric conversion element.

A projector according to an aspect of the invention includes: an optical component disposed in a sealed structure having a ringed air flow passage for circulating air; and a circulation fan for circulating the air in the ringed air flow passage. The sealed structure includes an optical component casing, a plurality of duct portions and the cooling device that has the above-described. The optical component casing accommodates the optical component and has an air inlet for taking air inside and an air outlet for exhausting the air to the outside. The plurality of duct members introduces air into the optical component casing through the air inlet and re-introduces the air that is exhausted from the optical component casing through the air outlet to the outside into the optical component casing through the air inlet. The heat absorbing surface of the thermoelectric conversion element faces the inside of the sealed structure. The heat releasing surface of the thermoelectric conversion element faces the outside of the sealed structure.

According to the aspect of the invention, since the projector is provided with the cooling device that has the above-described enhanced heat absorption efficiency, the air circulating in the to-be-cooled air flow passage can be efficiently cooled. In other words, the optical device accommodated in the optical component casing can be efficiently cooled.

Since the optical components such as the optical modulator are accommodated in the optical component casing of the sealed structure, dust, lamp black or the like can be prevented from adhering on the optical components, thereby ensuring stable image quality in projection image projected from the projector.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

First Exemplary Embodiment

A first exemplary embodiment of the invention will be described below with reference to the drawings.

1 External Arrangement

Figure 1:
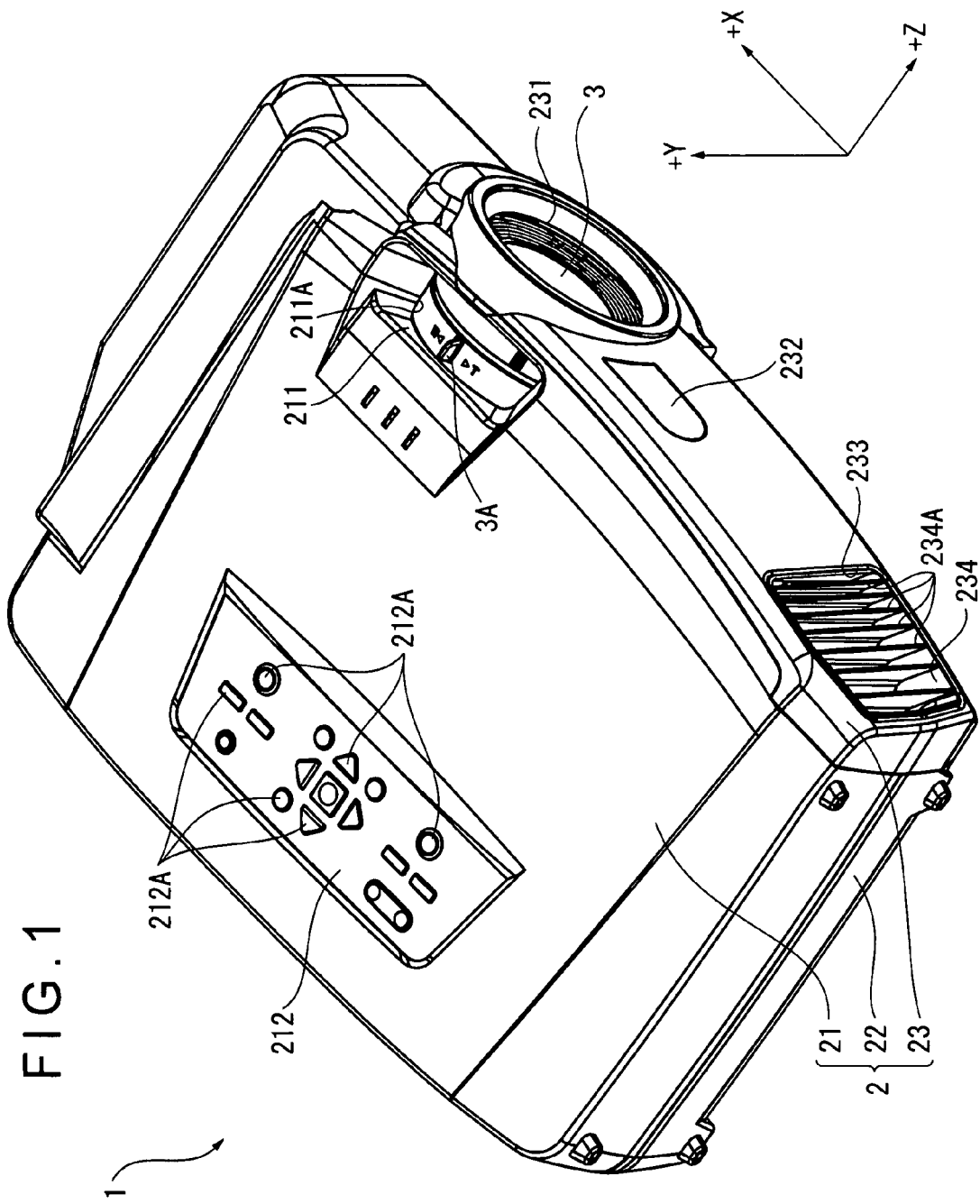
FIG. 1 is a perspective view showing an external appearance of a projector of a first exemplary embodiment.

FIG. 1 is a perspective view showing an external appearance of a projector 1 of the first exemplary embodiment. Specifically, FIG. 1 is a perspective view of the projector 1 when seen from an upper front side. Note that, in FIG. 1, a direction in which an optical image is projected is defined as the Z axis and two axes orthogonal to the Z axis are defined as the X axis (a horizontal axis) and the Y axis (a vertical axis) for easy understanding. In the other figures, the same is applied.

The projector 1 modulates a light beam irradiated from a light source in accordance with image information to form an optical image and projects the optical image on a screen (not shown) in an enlarged manner. As shown in FIG. 1, the projector 1 includes a substantially rectangular parallelepiped exterior casing 2 and a projection lens 3 as a projection optical device that is exposed from the exterior casing 2.

The projection lens 3 is a lens set including a plurality of lenses accommodated in a cylindrical lens barrel. The projection lens 3 projects in an enlarged manner the optical image that is modulated by a device main body of the projector 1 in accordance with the image information. The projection lens 3 includes a lever 3A for changing relative positions of the plurality of lenses. The projection lens 3 can adjust a focus and a magnification of the to-be-projected optical image.

The exterior casing 2 is a casing made of synthetic resin and accommodates the device main body of the projector 1. As shown in FIG. 1, the exterior casing 2 includes: an upper case 21 covering an upper portion, a part of a front surface portion, a part of a lateral surface portion and a part of a rear surface portion of the device main body; a lower case 22 covering a lower portion, a part of the front surface portion, a part of the lateral surface portion and a part of the rear surface portion of the device main body; and a front case 23 covering a part of the front surface portion of the device main body.

As shown in FIG. 1, a dented portion 211 that is dented toward an inner side of the exterior casing 2 is provided on a plus X axis direction side (the right side when seen from a front side) on the upper portion of the upper case 21. An opening portion 211A is formed in a bottom portion of the dented portion 211, the opening portion 211A communicating with the inside. The lever 3A of the projection lens 3 is exposed through the opening portion 211A, so that the lever 3A can be operated.

As shown in FIG. 1, an operation panel 212 for actuating and adjusting the projector 1 is provided substantially at the middle in plan view of the upper portion of the upper case 21, the operation panel 212 extending in right and left directions. When an operation button 212A of the operation panel 212 is appropriately pressed down, the operation button 212A touches a tactile switch mounted on a circuit board (not shown) disposed on an inner side of the operation button 212A, thereby allowing a desired operation.

Note that the circuit board of the above-described operation panel 212 is electrically connected with a later-described control board. An operation signal accompanying the pressing operation of the operation button 212A is output to the control board.

Although not specifically shown, a power-source air inlet is formed in the rear surface portion of the upper case 21 on a minus X axis direction side (the right side when seen from a rear side), the inside and the outside of the exterior casing 2 communicated with each other by the power-source air inlet. The power-source air inlet is an opening for taking cooling air from the outside to the inside of the exterior casing 2. The cooling air is introduced from the outside of the exterior casing 2 through the power-source air inlet into the inside of the exterior casing 2 by a later-described inside-casing cooling device of the device main body in the exterior casing 2. The cooling air is then sent to a power source unit of the device main body.

Figure 2:
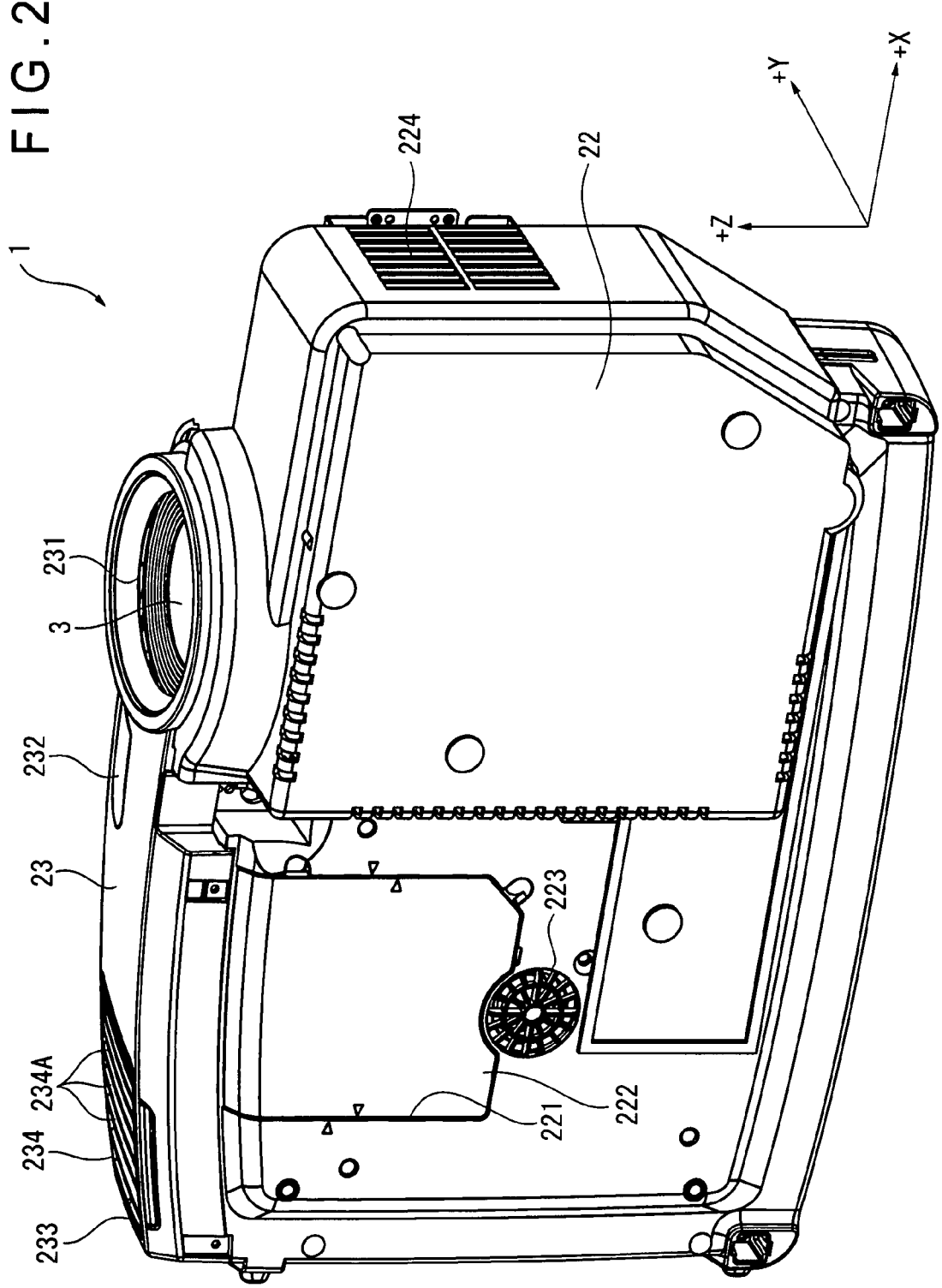
FIG. 2 is a perspective view showing a lower case and a front case when seen from a lower side of the first exemplary embodiment.

FIG. 2 is a perspective view of the lower case 22 and the front case 23 when seen from a front lower side.

As shown in FIG. 2, an opening 221 in a rectangular shape in plan view is formed in a bottom surface portion of the lower case 22 on the minus X axis direction side. A lid body 222 in a rectangular shape in plan view is detachably attached to the opening 221.

Although not specifically shown, when the lid body 222 is detached from the lower case 22, a part of a later-described light source device of the device main body in the exterior casing 2 is exposed, thereby enabling the light source device to be replaced through the opening 221.

As shown in FIG. 2, in the bottom surface portion of the lower case 22, a light-source air inlet 223 is formed on a minus Z axis direction side (the rear side) relative to the opening 221, the light-source air inlet 223 communicating the inside and the outside of the exterior casing 2.

The light-source air inlet 223 is an opening for taking cooling air from the outside of the exterior casing 2 to the inside of the exterior casing 2. The cooling air is introduced through the light-source air inlet 223 to the inside by the later-described inside-casing cooling device of the device main body in the exterior casing 2. The cooling air is then sent to the light source device of the device main body.

As shown in FIG. 2, in a lateral surface on a plus X axis direction side of the lower case 22, a cooling-device air inlet 224 is formed on a plus Z axis direction side (the front side), the cooling-device air inlet 224 communicating the inside and the outside of the exterior casing 2.

The cooling-device air inlet 224 is an opening for taking cooling air from the outside of the exterior casing 2 to the inside of the exterior casing 2. The cooling air is introduced through the cooling-device air inlet 224 to the inside by a later-described sealed circulating-air-cooling unit of the device main body inside the exterior casing 2. The cooling air is then sent to a heat releasing side of a peltiert unit of the sealed circulating-air-cooling unit.

In the rear surface of the lower case 22, a power-source air inlet 225 (see FIGS. 3 to 5) is formed on the minis X axis direction side, the power-source air inlet 225 communicating the inside and the outside of the exterior casing 2. Similarly to the power-source air inlet formed in the upper case 21, the power-source air inlet 225 is an opening for sending cooling air from the outside of the exterior casing 2 via the power-source air inlet 225 to the power source unit by the inside-casing cooling device.

As shown in FIGS. 1 and 2, in the front case 23, a circular hole 231 is formed on the plus X axis direction side. A tip end of the projection lens 3 is exposed through the circular hole 231. Specifically, an optical image is projected in an enlarged manner from the projection lens 3 through the circular hole 231 on a screen.

As shown in FIGS. 1 and 2, a remote controller light receiving window 232 is formed substantially at the center of the front case 23 in the X axis direction. A remote controller light receiving module (not shown) for receiving an operation signal from a remote controller (not shown) is disposed on an inner side of the remote controller light receiving window 232.

Note that the remote controller is provided with an activation switch, an adjustment switch and the like which are similar to those provided on the above-described operation panel 212. When the remote controller is operated, an infrared signal corresponding to the operation is output from the remote controller. The infrared signal is received by the remote controller light-receiving module via the remote controller light receiving window 232 and processed by the later-described control board.

As shown in FIG. 1 or 2, in the front case 23, an exhaust opening 233 for exhausting the air inside the exterior casing 2 to the outside is formed on the minus X axis direction side. As shown in FIG. 1 or 2, the exhaust opening 233 is provided with a louver 234 having a plurality of flow adjusting vanes 234A aligned in a grid-like manner. As shown in FIGS. 1 and 2, plate surfaces of the plurality of air adjusting vanes 234A are inclined in a direction receding from the YZ plane by a predetermined angle. The air inside the exterior casing 2 is oriented in a direction receding from the projection lens 3 by the exhaust opening 233 and the louver 234 to be exhausted to the outside.

2 Internal Arrangement

Figure 3:
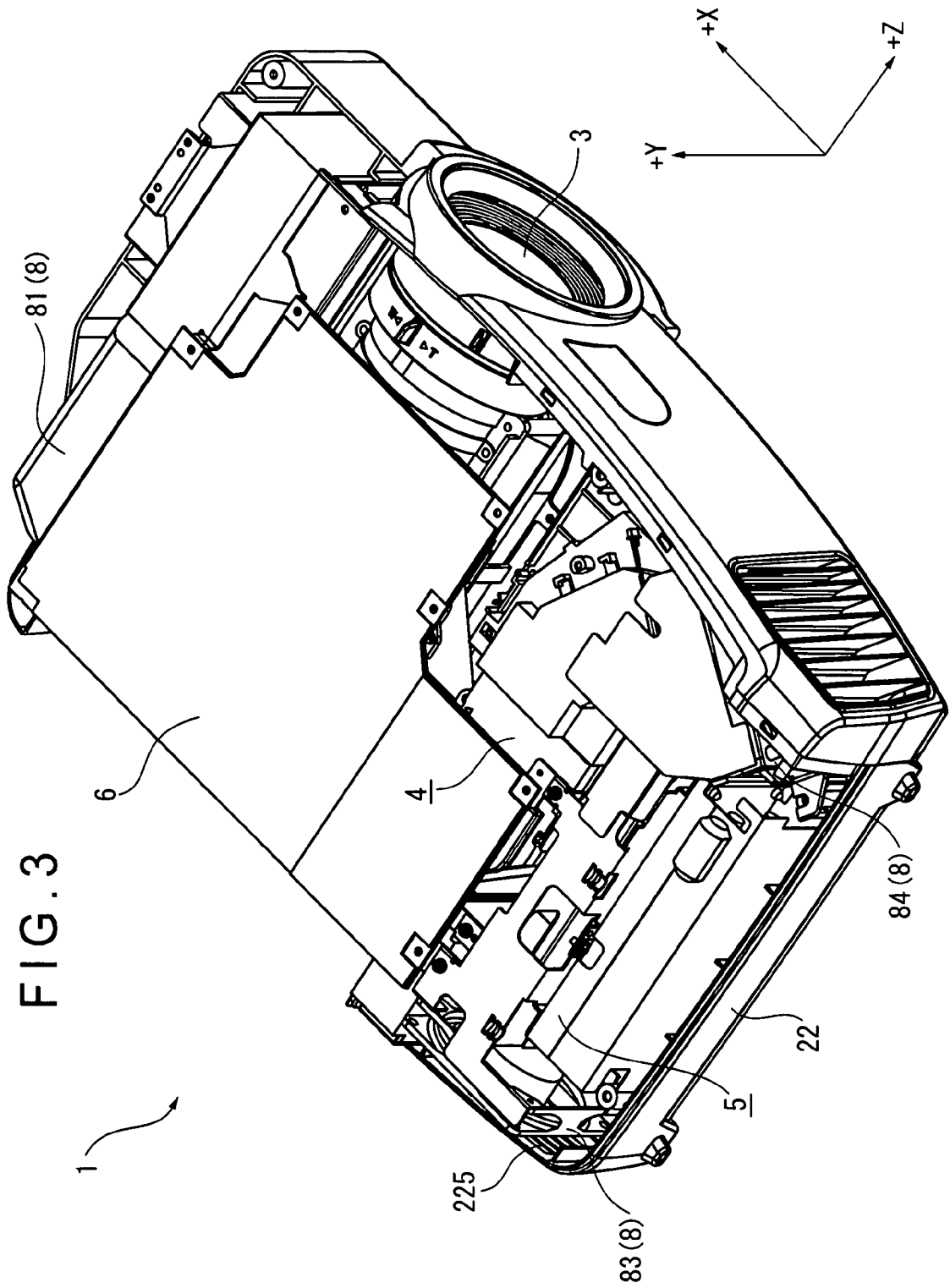
FIG. 3 shows an inner structure of the projector of the first exemplary embodiment.
Figure 4:
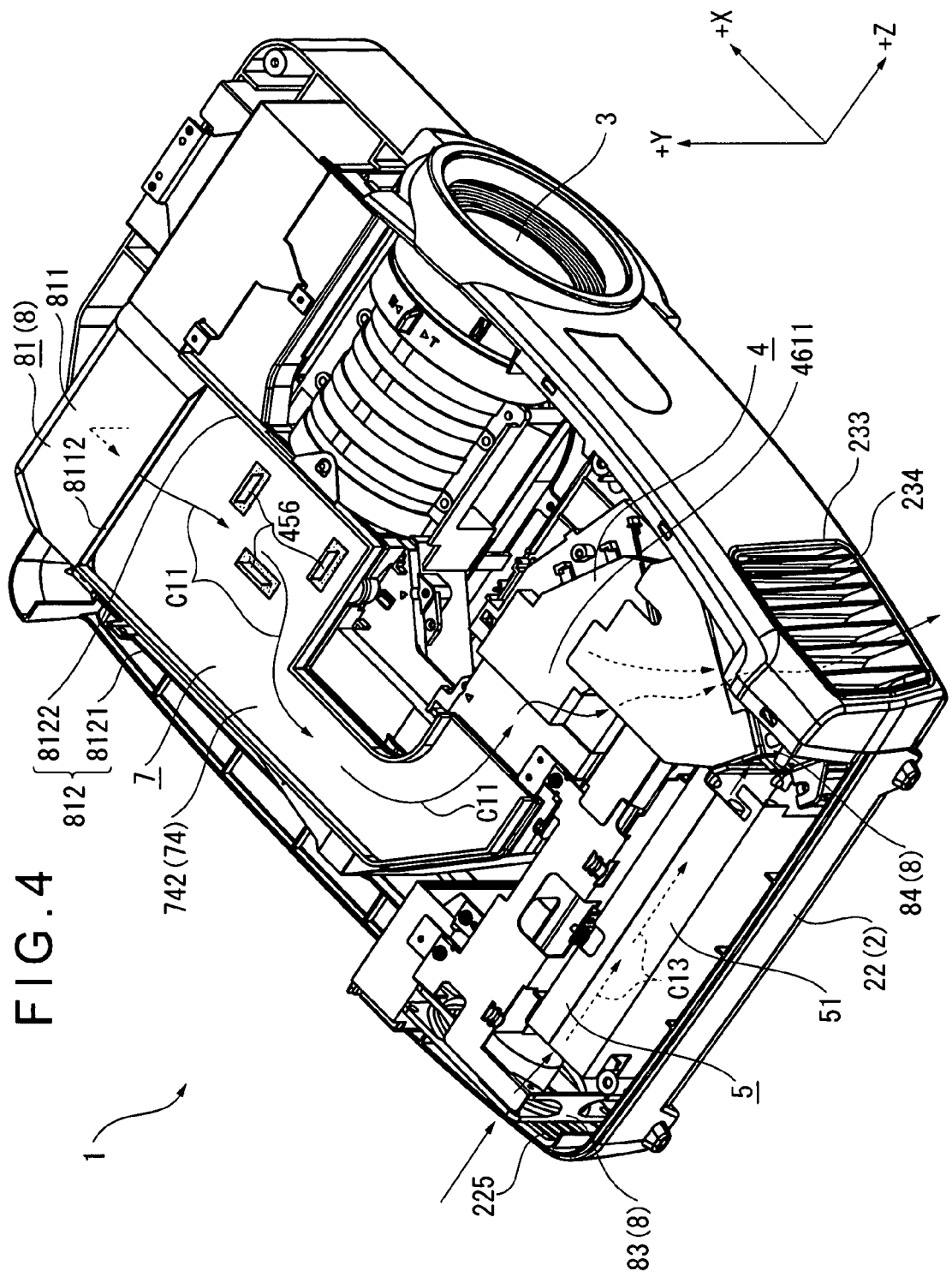
FIG. 4 shows the inner structure of the projector of the first exemplary embodiment.
Figure 5:
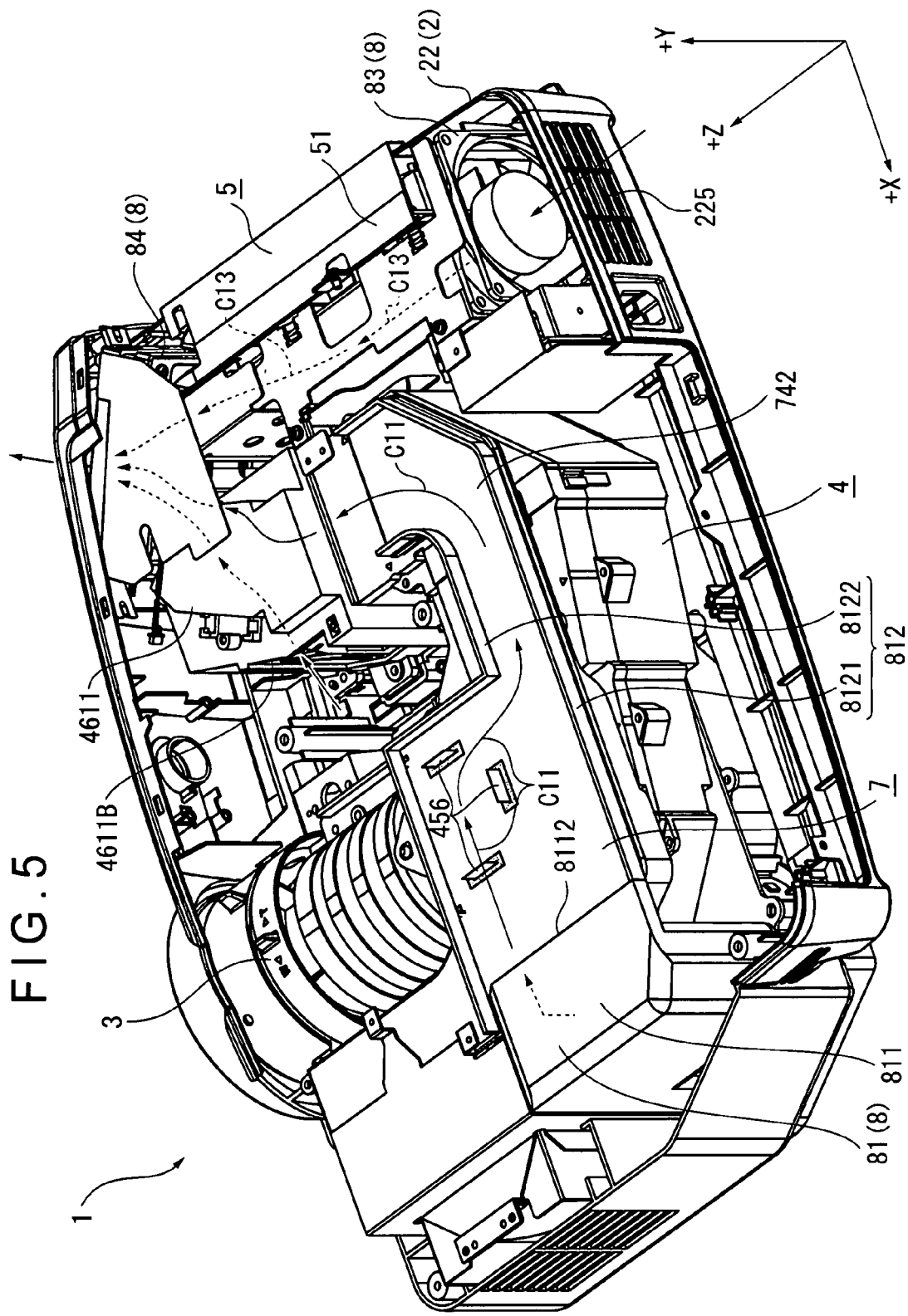
FIG. 5 shows the inner structure of the projector of the first exemplary embodiment.
Figure 6:
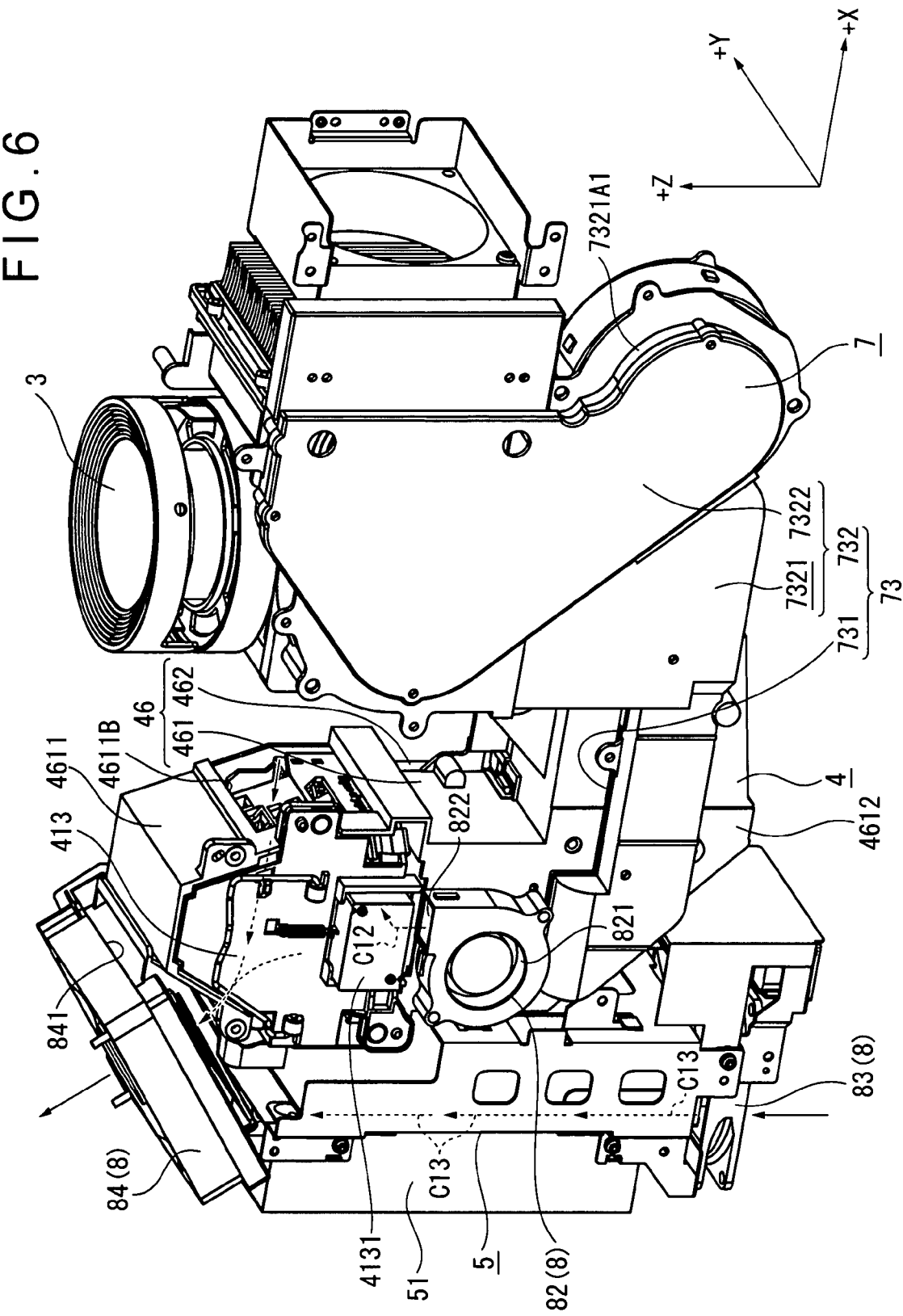
FIG. 6 shows the inner structure of the projector of the first exemplary embodiment.

FIGS. 3 to 6 each show an inner structure of the projector 1. Specifically, FIG. 3 shows the projector 1 of FIG. 1 with the upper case 21 removed. FIG. 4 shows the projector 1 of FIG. 3 with the control board 6 removed. FIG. 5 is a perspective view of the projector 1 of the FIG. 4 when seen from the rear surface side. FIG. 6 is a perspective view of the device main body of the projector 1 when seen from a lower side with the control board 6 removed.

As shown in FIGS. 3 to 6, the device main body is accommodated in the exterior casing 2. The device main body includes an optical unit 4, a power source unit 5, the control board 6 (FIG. 3), a sealed circulating-air-cooling unit 7 (FIGS. 4 to 6) and an inside-casing cooling device 8.

2-1 Structure of Optical Unit

Figure 7:
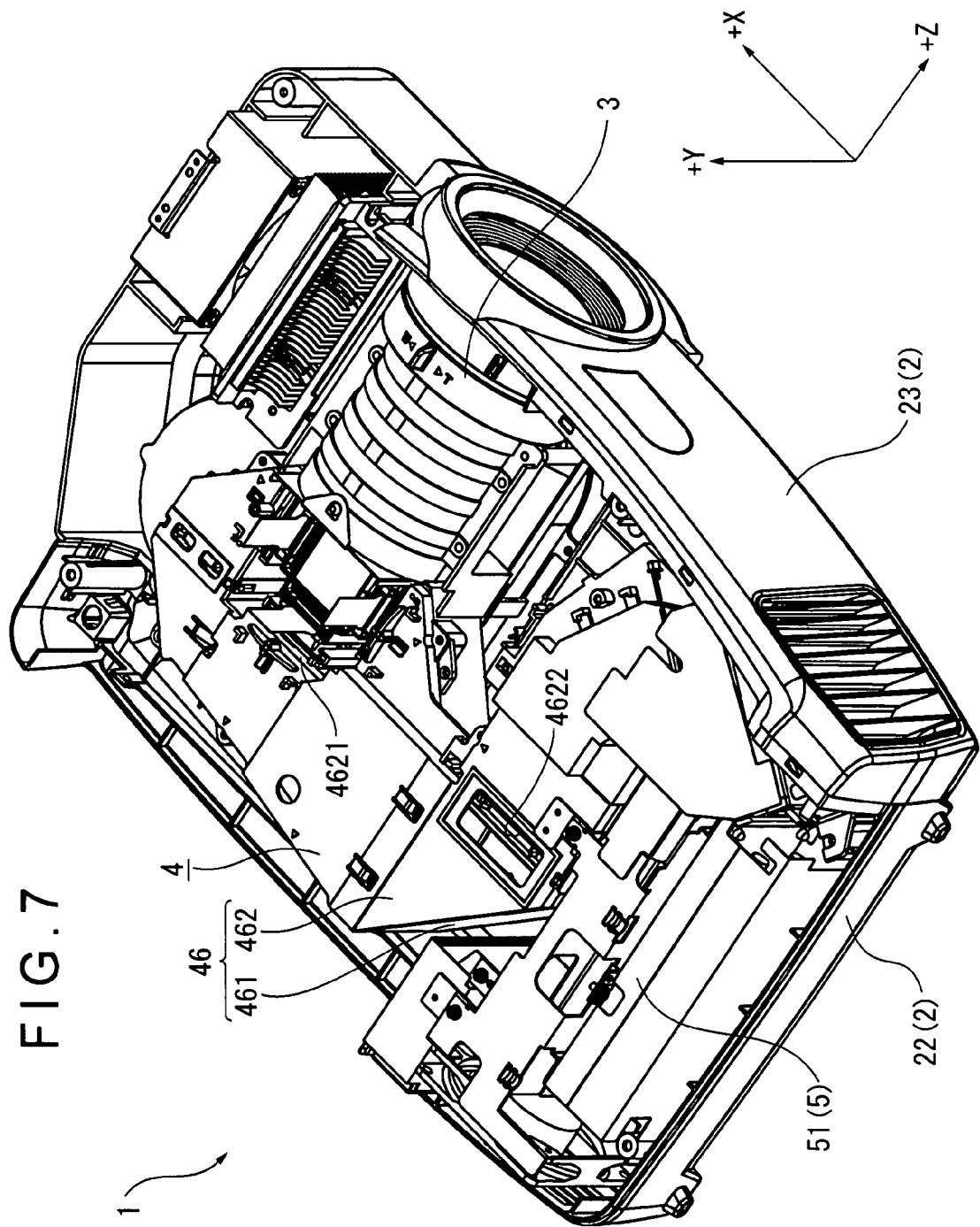
FIG. 7 shows a structure of an optical unit of the first exemplary embodiment.
Figure 8:
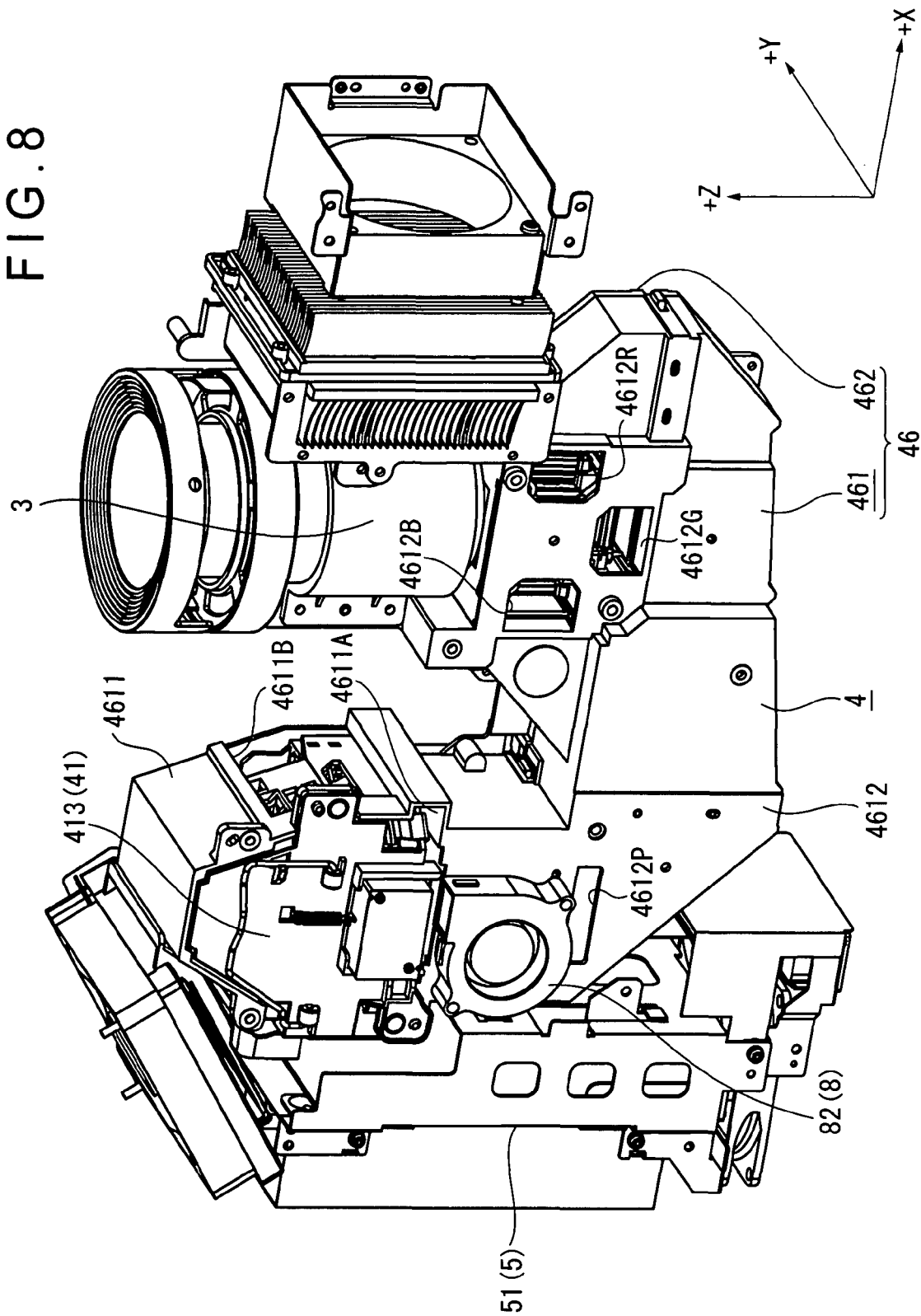
FIG. 8 shows the structure of the optical unit of the first exemplary embodiment.
Figure 9:
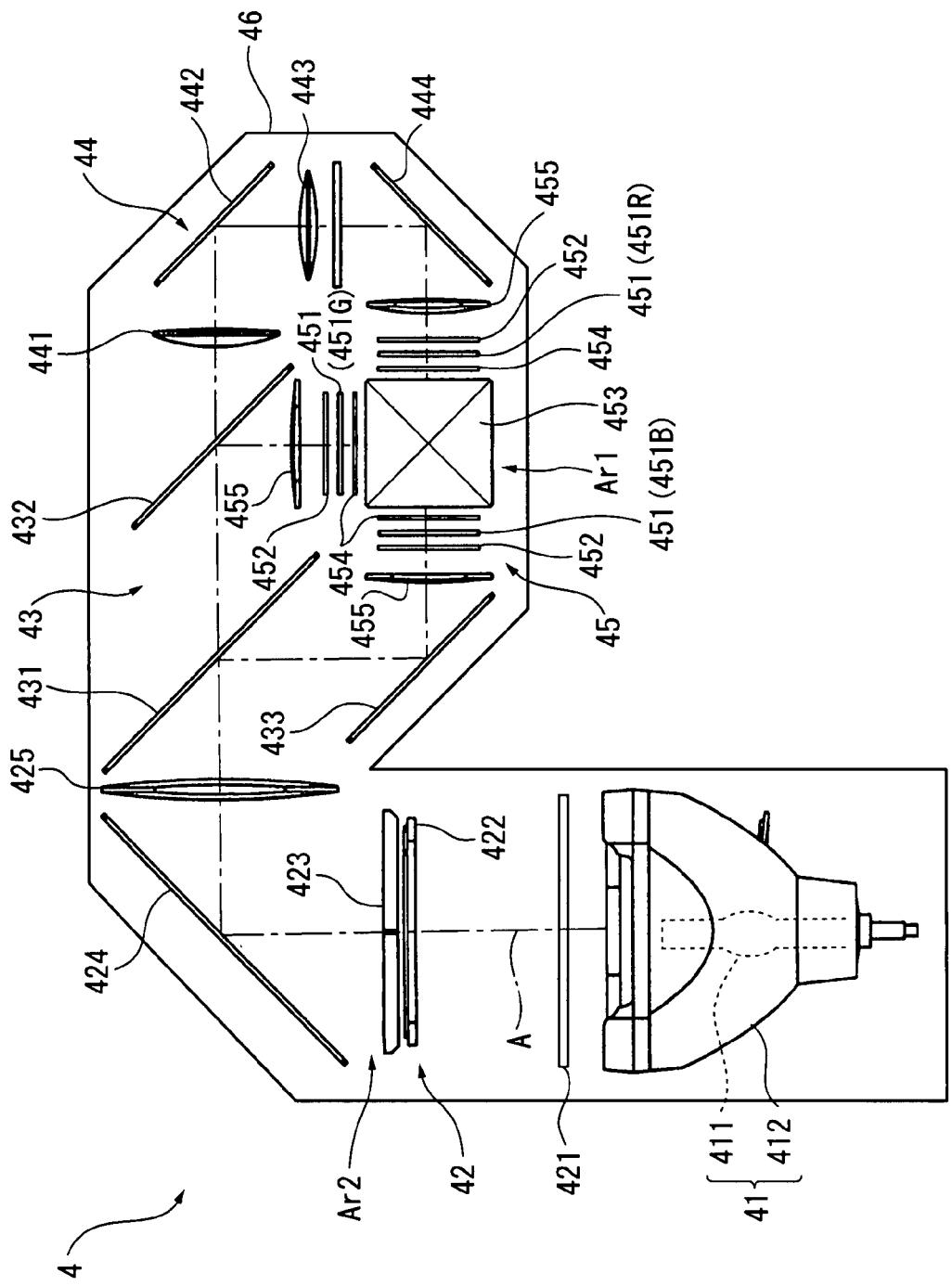
FIG. 9 shows the structure of the optical unit of the first exemplary embodiment.

FIGS. 7 to 9 each show a structure of the optical unit 4. Specifically, FIG. 7 shows the projector 1 of FIG. 4 with a peltier heat releasing air outlet unit 81 of the inside-casing cooling device 8 and a flow-path-downstream-side duct member 74 of the sealed circulating-air-cooling unit 7 removed. FIG. 8 shows the projector 1 of FIG. 6 with a flow-path-upstream-side duct member 73 of the sealed circulating-air-cooling unit 7 removed. FIG. 9 is a plan view schematically showing an optical system of the optical unit 4.

The optical unit 4 forms image light in accordance with image information under the control of the control board 6. As shown in FIG. 7, the optical unit 4 extends from the front surface side to the rear surface side of the exterior casing 2 in the Z axis direction. An end of the optical unit 4 in the minus Z axis direction bends into the plus X axis direction. The optical unit 4 then bends into the plus Z axis direction to further extend. Thus, the optical unit 4 has a substantially U-shape in plan view. As shown in FIG. 9, the optical unit 4 includes a light source device 41, an integrator illuminating optical system 42, a color separating optical system 43, a relay optical system 44, an optical device 45 and an optical component casing 46.

The light source device 41 aligns a light beam emitted from a light source lamp 411 in one direction to irradiate, thereby illuminating the optical device 45. As shown in FIG. 9, the light source device 41 includes the light source lamp 411, a reflector 412 and a lamp housing 413 (FIG. 8) that holds the light source lamp 411 and the reflector 412. The light source device 41 is accommodated in a light-source-device accommodating portion 4611 (FIG. 8) that is connected to the optical component casing 46. Since the light source device 41 is accommodated in the light-source-device accommodating portion 4611, the light source device 41 is positioned at a predetermined position relative to the optical component casing 46 (at a position on which a central axis of the light beam irradiated from the light source device 41 and an illumination optical axis A set in the optical component casing 46 coincide with each other).

As the light source lamp 411, a halogen lamp, a metal halide lamp or a high-pressure mercury lamp are often used.

Herein, as the reflector 412, a parabola reflector is used, which substantially collimates the light beam irradiated from the light source lamp 411 and reflects the collimated light. Note that the reflector 412 may not be a parabola reflector but may be an ellipsoidal reflector that reflects, in cooperation with a collimating lens, the light beam irradiated from the light source lamp 411 so as to be converged to a predetermined position.

The integrator illuminating optical system 42 divides the light beam irradiated from the light source device 41 into a plurality of partial light beams, thereby equalizing in-plane illuminance of an illumination area. As shown in FIG. 9, the integrator illuminating optical system 42 includes a first lens array 421, a second lens array 422, a polarization converter 423, a reflecting mirror 424 and a superposing lens 425.

The first lens array 421 serves as a light beam dividing optical element that divides the light beam irradiated from the light source device 41 into a plurality of partial light beams. The first lens array 421 includes a plurality of small lenses arranged in a matrix manner in a plane orthogonal to the illumination optical axis A.

The second lens array 422 is an optical element that converges the plurality of partial light beams divided by the above-described first lens array 421. Similarly to the first lens array 421, the second lens array 422 includes a plurality of small lenses arranged in a matrix manner in a plane orthogonal to the illumination optical axis A.

The polarization converter 423 aligns a polarization direction of each of the partial light beams divided by the first lens array 421 to form a substantially uniform linear polarized light.

Although not shown, the polarization converter 423 includes polarization separating films and reflecting films alternately aligned with an inclination relative to the illumination optical axis A. The polarization separating films transmit one type of polarized light beam out of a P polarized light beam and an S polarized light beam contained in each partial light beam. The polarization separating films reflect the other type of polarized light beam. The reflected other type of polarized light beam is bent by the reflecting film into a direction along an irradiation direction of the one type of polarized light beam (i.e. into a direction along the illumination optical axis A). One of the irradiated polarized light beams is polarization-converted by a phase plate provided on a light beam emitting surface of the polarization converter 423, so that substantially all of the polarized directions of the polarized light beams are aligned. By using such a polarization converter 423, the light beams irradiated from the light source device 41 can be aligned into the polarized light beams in a substantially uniform direction, thereby enhancing usage efficiency of light source light used by the optical device 45.

The superposing lens 425 is an optical element that converges the plurality of partial light beams having transmitted through the first lens array 421, the second lens array 422, the polarization converter 423 and the reflecting mirror 424 in order to superpose the converged light beams on image formation areas of later-described three liquid crystal panels of the optical device 45.

As shown in FIG. 9, the color separating optical system 43 includes two dichroic mirrors 431, 432 and a reflecting mirror 433. By the dichroic mirrors 431, 432, the color separating optical system 43 separates the plurality of the partial light beams irradiated from the integrator illuminating optical system 42 by the dichroic mirrors 431, 432 into three colors of light of red (R), green (G) and blue (B).

The dichroic mirrors 431, 432 are optical elements each having a substrate on which a wavelength selecting film is provided. The wavelength selecting film reflects a light beam in a predetermined wavelength range and transmits a light beam in the other wavelength ranges. The dichroic mirrors 431 disposed on the upstream of an optical path is a mirror that reflects the blue color light and transmits the red and green color light. The dichroic mirrors 432 disposed on the downstream of the optical path is a mirror that reflects the green color light and transmits the red color light.

The relay optical system 44 includes an incident-side lens 441, a relay lens 443 and reflecting mirrors 442, 444 and guides the red color light having transmitted through the dichroic mirrors 431, 432 of the color separating optical system 43, the red color light guided to the optical device 45. Note that the reason why the relay optical system 44 is used for the optical path of the red color light is to avoid deterioration in light utilization efficiency due to light dispersion and the like which may be caused by a longer length of the optical path of the red color light than those of the optical paths of the other color light. In the first exemplary embodiment, such an arrangement is employed since the length of the optical path of the red color light is set long. However, another arrangement may be employed in which the length of the optical path of the blue color light is set long and the relay optical system 44 is used for the optical path of the blue color light.

The blue color light separated by the above-described dichroic mirror 431 is bent by the reflecting mirror 433 and fed to the optical device 45 via a field lens 455. The green color light separated by the dichroic mirror 432 is directly fed to the optical device 45 via the field lens 455. The red color light is converged and bent by the lenses 441, 443 and the reflecting mirrors 442, 444 of the relay optical system 44 to be fed to the optical device 45 via the field lens 455. Note that the field lenses 455 respectively disposed on the upstream of the optical paths of the color light of the optical device 45 are provided for converting each partial light beam irradiated by the respective second lens arrays 422 into a light beam parallel to a main light beam of the partial light beam.

The optical device 45 modulates an incident light beam in accordance with image information and forms a color image. As shown in FIG. 9, the optical device 45 includes the three liquid crystal panels 451 as to-be-irradiated optical modulators (a liquid crystal panel 451R on the red color light side, a liquid crystal panel 451G on the green color light side and a liquid crystal panel 451B on the blue color light side) and a cross dichroic prism 453. Note that incident-side polarization plates 452 are respectively interposed between the field lenses 455 and the liquid crystal panels 451. Irradiation-side polarization plates 454 are respectively interposed between the liquid crystal panels 451 and the cross dichroic prism 453. Light modulation of incident color light is conducted by the incident-side polarization plates 452, the liquid crystal panels 451 and the irradiation-side polarization plates 454.

Each liquid crystal panel 451 is a pair of transparent glass substrates with liquid crystal (electrooptic material) sealed therebetween. Each liquid crystal panel modulates the polarization direction of the polarized light beam irradiated by the incident-side polarization plate 452 in accordance with an image signal using, for example, polycrystalline silicon TFT (Thin Film Transistor) as a switching element.

The cross dichroic prism 453 is an optical element for forming the color image by combining the optical images that are modulated for each color light irradiated by the irradiation-side polarization plates 454. The cross dichroic prism 453 has a substantially square shape in plane view with four right-angle prisms attached with each other. Dielectric multi-layered films are formed on the boundaries adhering the respective right-angle prisms. One of the dielectric multi-layered films in a substantially X-shape reflects the red color light, and the other dielectric multi-layer film reflects the blue color light. The red and blue color light is bent by the dielectric multi-layered films to be aligned with an advancing direction of the green color light, thereby combining the three color light.

As shown in FIG. 9, the optical component casing 46 has a U-shape in plan view. A predetermined illumination optical axis A is set in the optical component casing 46. The above-described optical systems 41 to 45 are disposed at predetermined positions in the optical component casing 46. As shown in FIG. 7 or 8, the optical component casing 46 includes a component accommodating member 461 and a lid-like member 462.

As shown in FIG. 8, the component accommodating member 461 includes a light-source-device accommodating portion 4611 and a component-accommodating-portion main body 4612.

As shown in FIG. 8, the light-source-device accommodating portion 4611 is positioned on one end side of the U-shape of the optical component casing 46 and formed in a container-like shape having an opening portion 4611A on a minus Y axis direction side (the lower side). The light source device 41 can be detachably attached in the light-source-device accommodating portion 4611 through the opening portion 4611A.

As shown in FIG. 8, in the light-source-device accommodating portion 4611, opening portions 4611B are formed in lateral surfaces orthogonal to the X axis direction (on lateral surfaces facing an inner side and an outer side of the U-shape of the optical component casing 46) (FIG. 8 shows only one opening portion in the lateral surface on the inner side of the U-shape). The opening portions 4611B enable air to flow in the light-source-device accommodating portion 4611 to cool the light source device 41 therein.

The component-accommodating-portion main body 4612 has an opening portion (not shown) on a plus Y axis direction side (the upper side), forming a container-like shape. Through this opening portion, the optical systems 42, 43 are accommodated in the component-accommodating-portion main body 4612 such that the optical systems 42, 43 are aligned in this order from one end side on which the component-accommodating-portion main body 4612 is connected with the light-source-device accommodating portion 4611 and such that the optical device 45 is accommodated on the other end side (the opposite side of the one end side), these components 42, 43 and 45 accommodated through the opening portion.

As shown in FIG. 8, in an end surface in the minus Y axis direction of the component-accommodating-portion main body 4612, opening portions 4612R, 4612G and 4612B are formed at positions corresponding to the positions of the liquid crystal panels 451R, 451G and 451B of the optical device 45.

As shown in FIG. 8, in the end surface in the minus Y axis direction of the component-accommodating-portion main body 4612, an opening portion 4612P is formed at a position corresponding to the position of the polarization converter 423.

The opening portions 4612R, 4612G, 4612B, 4612P serve as inflow ports for allowing air to flow into a space Ar1 (FIG. 9) around the position of the optical device 45 in the optical component casing 46 and into a space Ar2 (FIG. 9) around the position of the polarization converter 423.

As shown in FIG. 7, the lid-like member 462 is a member for closing an open portion on the plus Y axis direction side of the component-accommodating-portion main body 4612. The lid-like member 462 has a substantially common plane shape to that of the component-accommodating-portion main body 4612.

As shown in FIG. 7, the lid-like member 462 is provided with a cutout 4621 at a position corresponding to the position of the optical device 45. The cutout 4621 has a U-shape so as to planarly cover the optical device 45.

As shown in FIG. 7, the lid-like member 462 has an opening portion 4622 provided at a position corresponding to the position of the polarization converter 423.

The cutout 4621 and the opening portion 4622 serve as outflow ports for exhausting the air in the spaces Ar1, Ar2 in the optical component casing 46, the air flown to the spaces Ar1, Ar2 through the opening portions 4612R, 4612G, 4612B, 4612P, to the outside of the optical component casing 46.

Note that although not specifically shown, in the optical component casing 46, the space Ar1 is adapted not to communicate with another adjacent space by an optical component such as a rib provided to the component-accommodating-portion main body 4612, the incident-side polarization plates 452, the field lenses 455. Similarly, in the optical component casing 46, the space Ar2 is adapted not to communicate with another adjacent space by an optical component such as the rib provided to the component-accommodating-portion main body 4612, the second lens array 422, the superposing lens 425.

2-2 Structure of Power Source Unit

The power source unit 5 supplies electric power to components of the device main body of the projector 1. As shown in FIG. 8, the power source unit 5 is disposed along a lateral surface of the exterior casing 2 in the minus X axis direction so as to extend from the rear surface side to the front surface side. Although not specifically shown, the power source unit 5 includes a power source block that supplies electric power provided from the outside via a power source cable to the components and a lamp driving block that turns on the power source lamp 411 in accordance with the electric power supplied from the power source block. As shown in FIG. 7 or 8, the power source block and the lamp driving block are enclosed by a shield member 51 of metal such as aluminum, the shield member 51 being open at both sides. Accordingly, the air flown from the rear surface side by the shield member 51 is guided toward the front surface side, and electromagnetic noise generated in the power source block or the lamp driving block is prevented from leaking to the outside.

2-3 Structure of Sealed Circulating-Air-Cooling Unit

Figure 10:
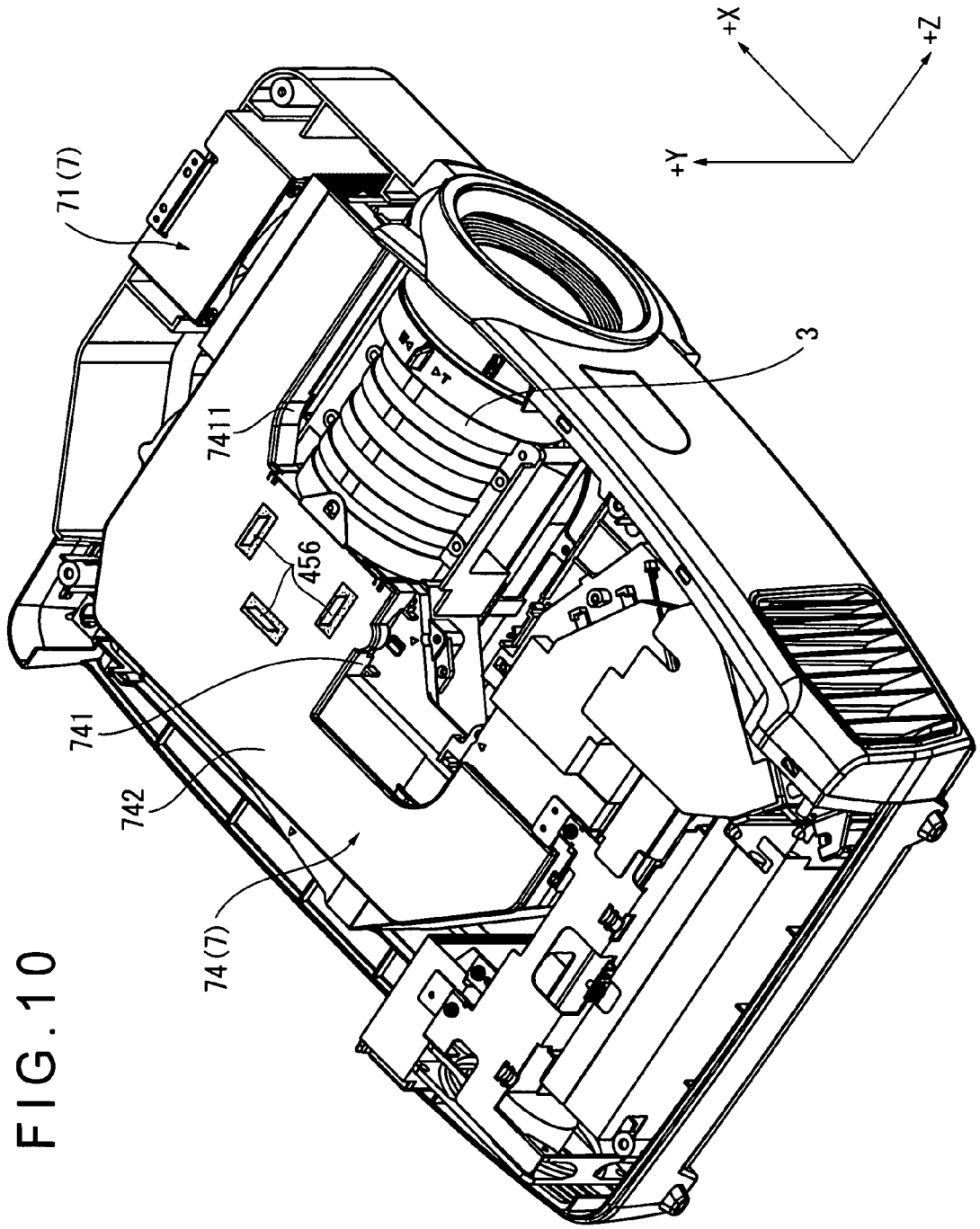
FIG. 10 shows a structure of a sealed circulating-air-cooling unit of the first exemplary embodiment.
Figure 11:
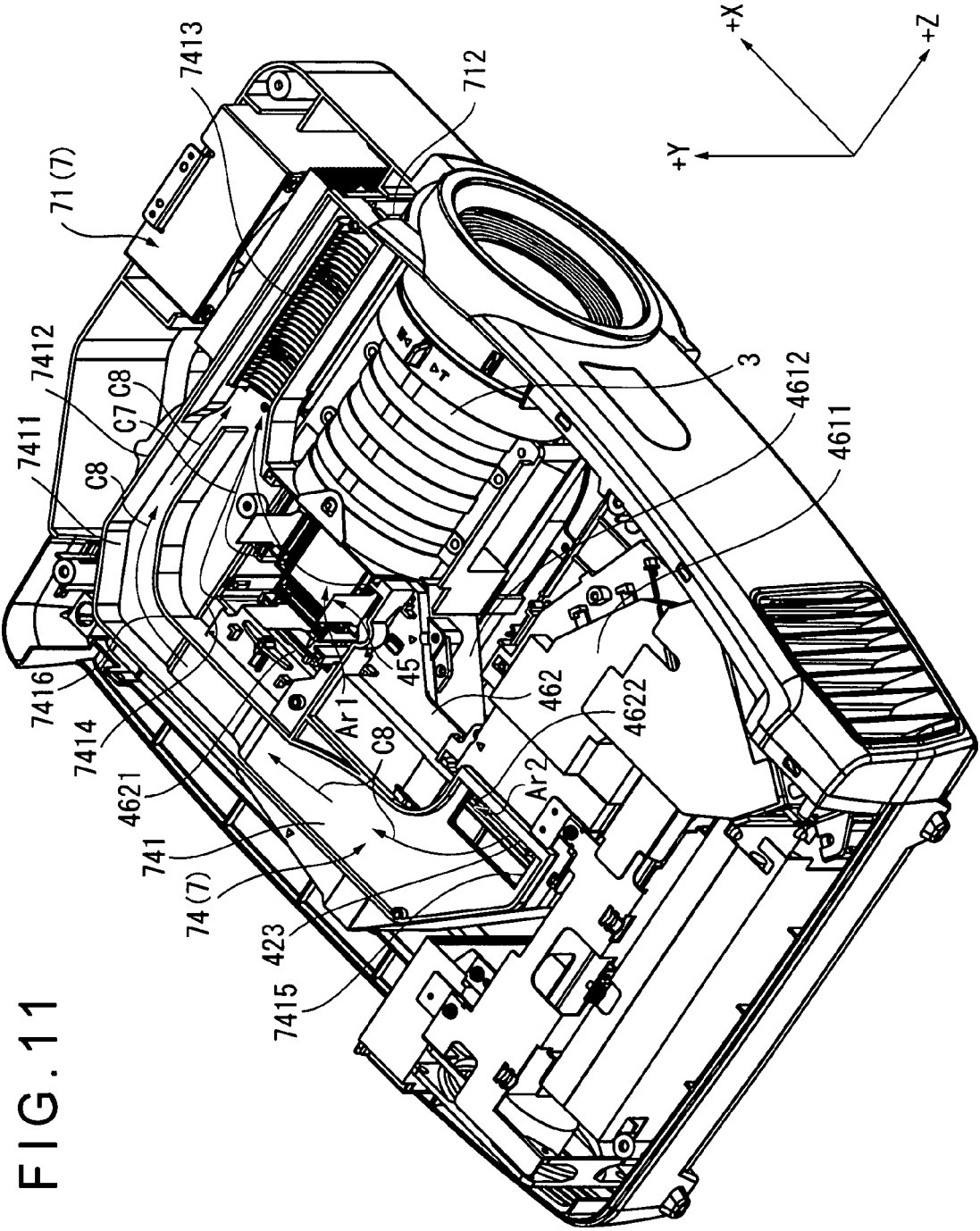
FIG. 11 shows the structure of the sealed circulating-air-cooling unit of the first exemplary embodiment.
Figure 12:
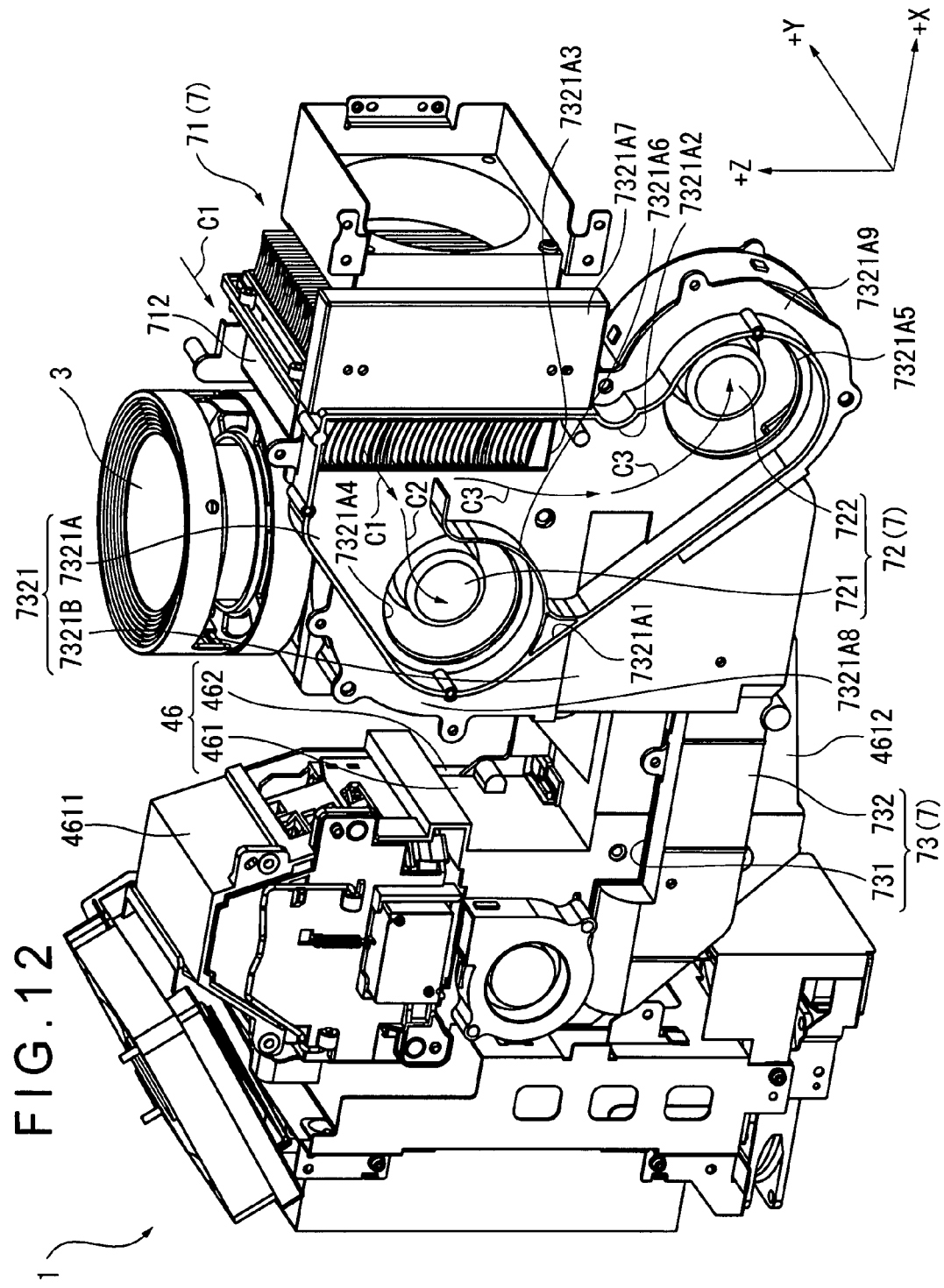
FIG. 12 shows the structure of the sealed circulating-air-cooling unit of the first exemplary embodiment.
Figure 13:
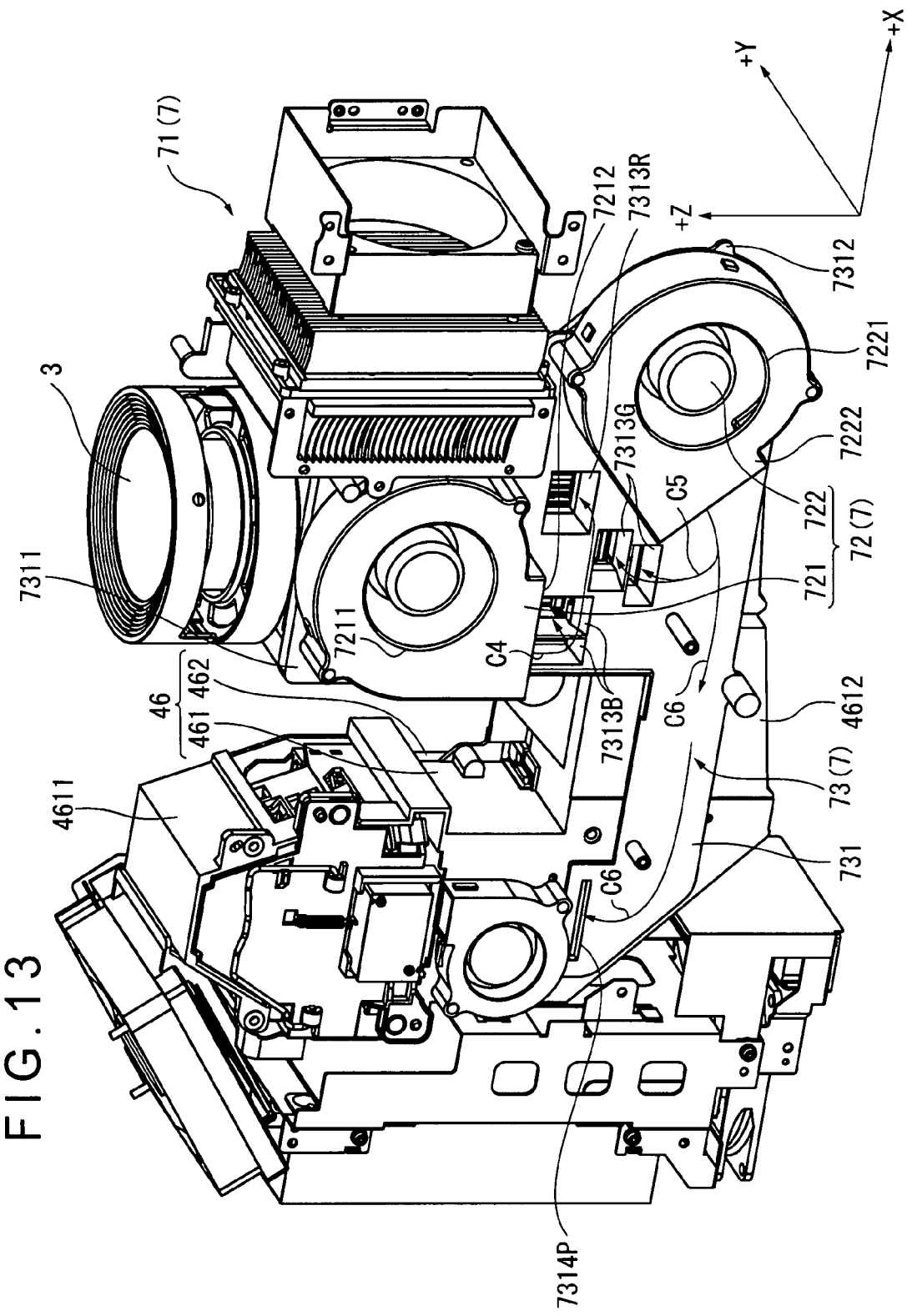
FIG. 13 shows the structure of the sealed circulating-air-cooling unit of the first exemplary embodiment.
Figure 14:
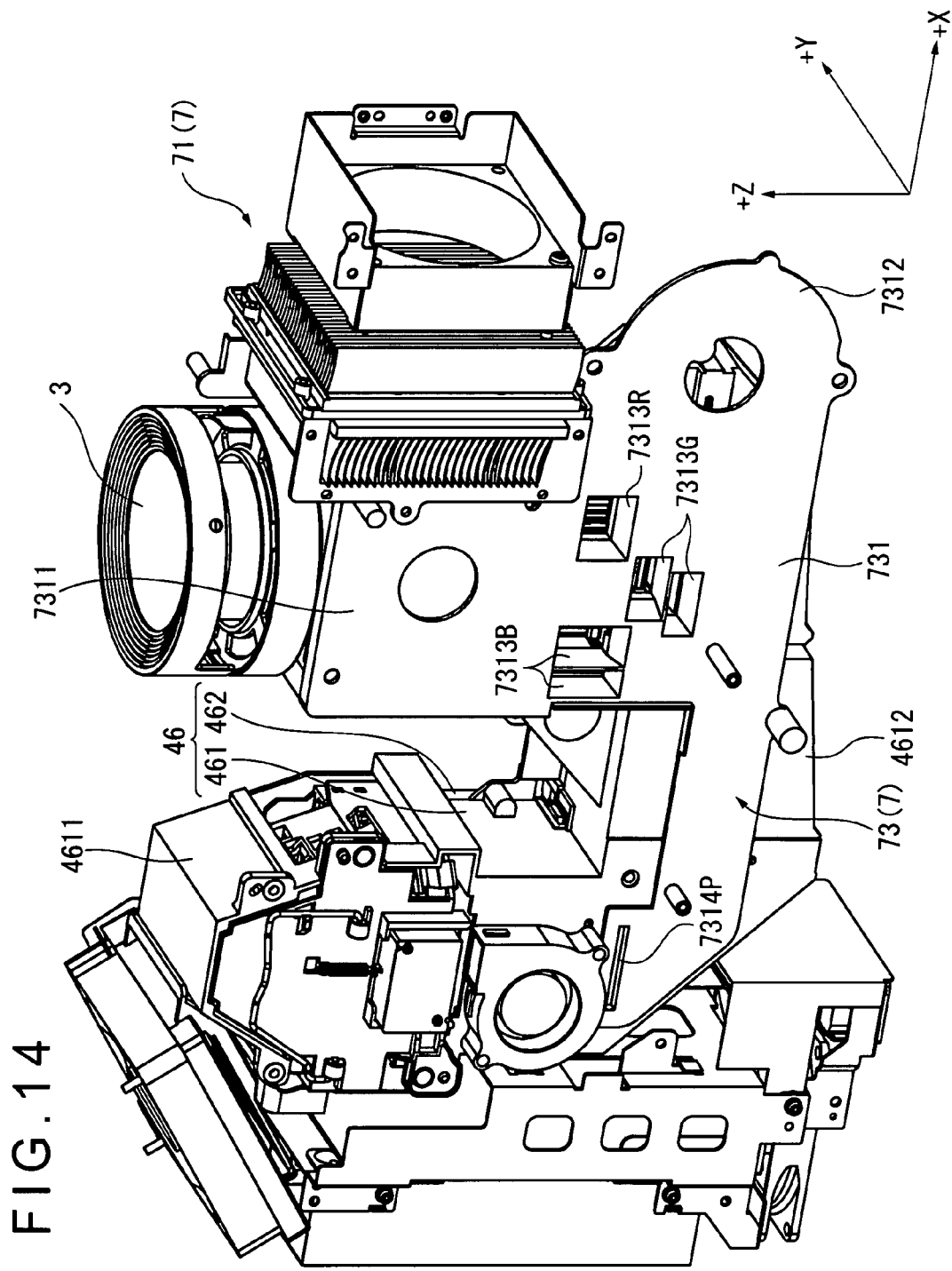
FIG. 14 shows the structure of the sealed circulating-air-cooling unit of the first exemplary embodiment.

FIGS. 10 to 14 each show a structure of the sealed circulating-air-cooling unit 7 Specifically, FIG. 10 shows a state shown in FIG. 4 with the peltier heat releasing air outlet unit 81 of the inside-casing cooling device 8 removed. FIG. 11 shows a state shown in FIG. 10 with a high-heat-conductive duct portion 742 removed. FIG. 12 shows a state shown in FIG. 6 with a cover member 7322 removed. FIG. 13 shows a state shown in FIG. 12 with a duct main body 732 removed. FIG. 14 shows a state shown in FIG. 13 with a circulation fan 72 removed.

The sealed circulating-air-cooling unit 7 and the optical component casing 46 form a sealed structure of the invention. The sealed circulating-air-cooling unit 7 circulates air in a ringed air flow passage including the spaces Ar1, Ar2 in the optical component casing 46 and cools the optical device 45 and the polarization converter 423 disposed in the spaces Ar1, Ar2. As shown in FIGS. 10 to 14, the sealed circulating-air-cooling unit 7 includes a cooling device 71, the circulation fan 72 (FIG. 12, FIG. 13), a flow-path-upstream-side duct member 73 (FIGS. 12 to 14) and the flow-path-downstream-side duct member 74 (FIG. 10, FIG. 11).

Note that the components will be described in the order of alignment along the air flow passage, starting from the upstream side of the spaces Ar1, Ar2. A structure of the circulation fan 72 will be described in detail when the flow-path-upstream-side duct member 73 is described.

2-3-1 Structure of Cooling Device

Figure 15:
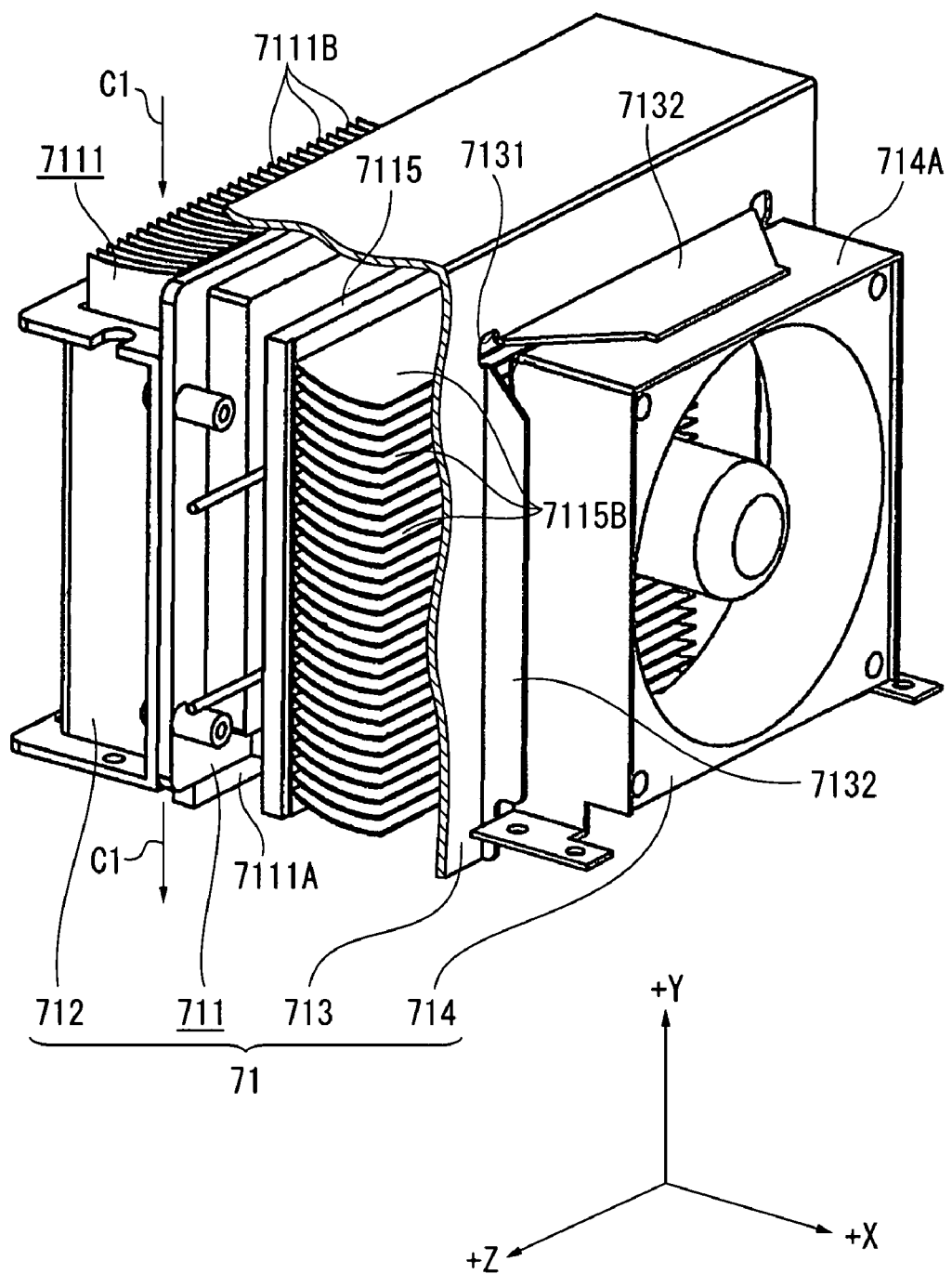
FIG. 15 is a perspective view showing a structure of a cooling device of the first exemplary embodiment.

FIG. 15 is a perspective view showing a structure of the cooling device 71. Specifically, FIG. 15 is a perspective view of the cooling device 71 when seen from the plus X axis direction side.

As shown in FIGS. 10 to 14, the cooling device 71 is adjacently disposed in the plus X axis direction side of the projection lens 3. The cooling device 71 absorbs heat in the air circulating in the air flow passage in the sealed structure and releases the heat to the outside of the sealed structure. As shown in FIG. 15, the cooling device 71 includes a peltier unit 711, a heat-absorbing-side duct 712, a heat-releasing-side duct 713 and a cooling fan 714.

Figure 16:
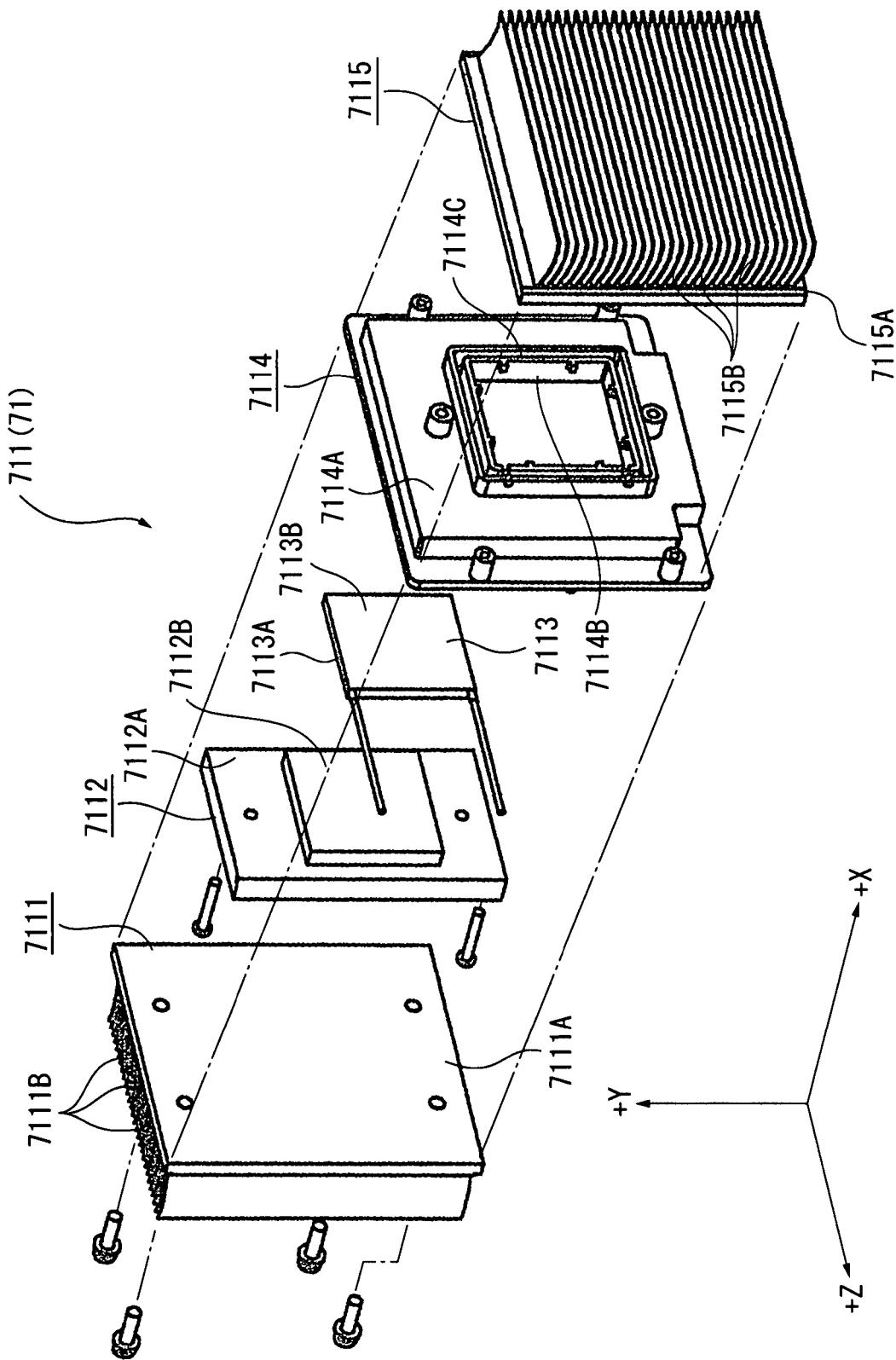
FIG. 16 shows a structure of a peltiert unit of the first exemplary embodiment.
Figure 17:
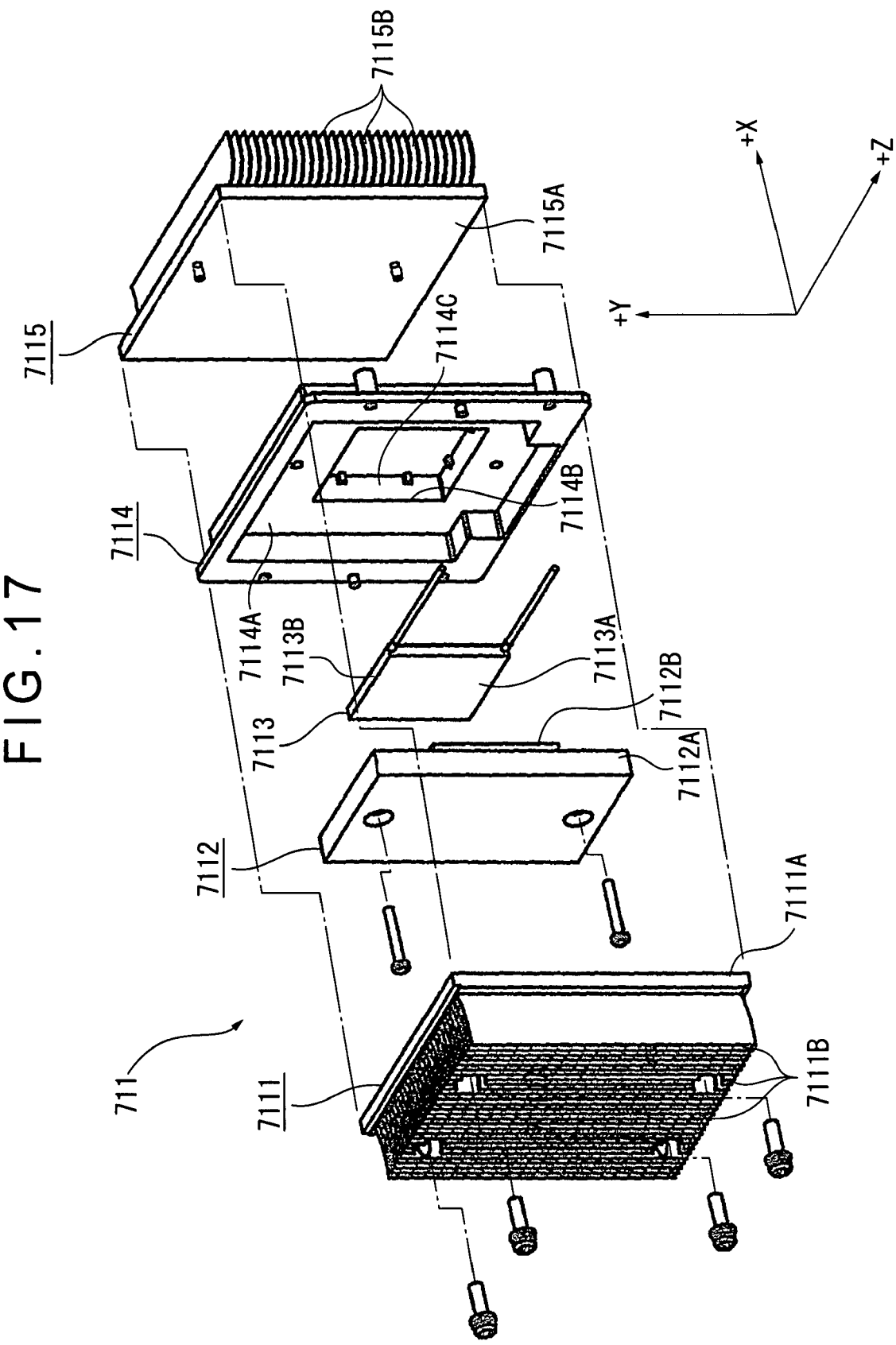
FIG. 17 shows the structure of the peltiert unit of the first exemplary embodiment.
Figure 18:
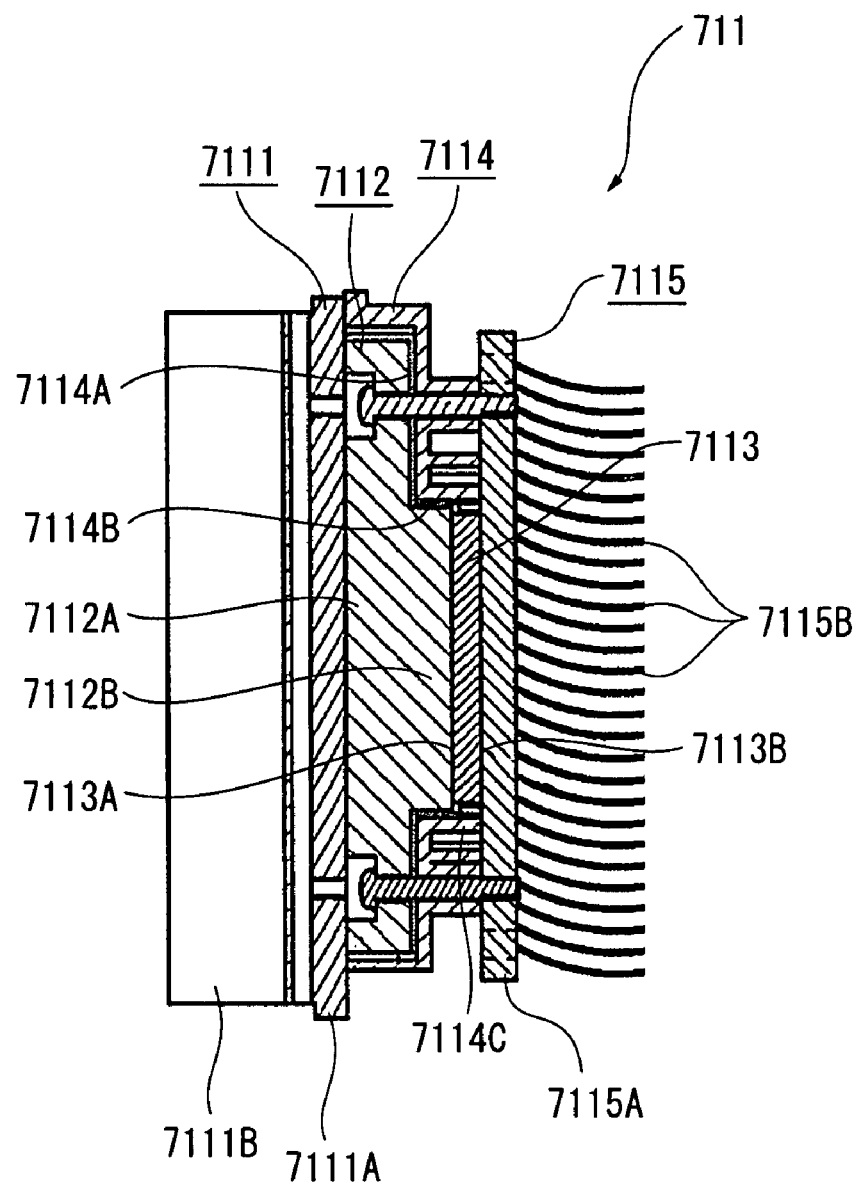
FIG. 18 shows the structure of the peltiert unit of the first exemplary embodiment.

FIGS. 16 to 18 each show a structure of the peltier unit 711. Specifically, FIG. 16 is an exploded perspective view of the peltier unit 711 when seen from the plus X axis direction side (from the side remote from the projection lens 3). FIG. 17 is an exploded perspective view of the peltier unit 711 when seen from the minus X axis direction side (from the side close to the projection lens 3). FIG. 18 is a cross section of the peltier unit 711 when seen from the plus Z axis direction side.

FIGS. 16 to 18, the peltier unit 711 includes a heat-absorbing-side heat conductive member 7111, a stepped block 7112 as a spacer, a peltier element 7113 as a thermoelectric conversion element, a heat-transfer inhibiting member 7114 and a heat-releasing-side heat conductive member 7115, all of which are arranged in the mentioned order from the projection lens 3 side.

Although not specifically shown, the peltier element 7113 includes a plurality of jointed pairs which is electrically connected in tandem, each jointed pair formed by a P semiconductor element and an N semiconductor which are jointed with each other by a metal piece.

As shown in FIGS. 16 to 18, in the peltier element 7113 having such an arrangement, when a predetermined electrical pressure is applied under the control of the control board 6, one surface of the peltier element 7113 becomes a heat absorbing surface 7113A for absorbing heat and another surface becomes a heat releasing surface 7113B for releasing heat.

The peltier element 7113 generally has a thickness of about 4 mm.

The heat-absorbing-side heat conductive member 7111 is formed of a high-heat-conductive material (see Table 1 below) and is connected via the stepped block 7112 to the heat absorbing surface 7113A of the peltier element 7113 in a heat conductive manner. As shown in FIGS. 16 to 18, the heat-absorbing-side heat conductive member 7111 includes a rectangular plate body 7111A and a plurality of heat-absorbing-side fin members 7111B that protrudes from an end surface in the minus X axis direction of the plate body 7111A (from an opposite end surface of the connecting surface to the stepped block 7112) to extend in the Y axis direction (in the vertical direction), thereby forming a heat sink.

The stepped block 7112 is formed of the high-heat-conductive material (see Table 1 below) and interposed between the plate body 7111A of the heat-absorbing-side heat conductive member 7111 and the heat absorbing surface 7113A of the peltier element 7113. As shown in FIGS. 16 to 18, the stepped block 7112 includes a block main body 7112A in a plate-like shape and a bulged portion 7112B in a plate-like shape which bulges from an end surface of the block main body 7112A in the X axis direction (from an end surface on the peltier element 7113 side).

As shown in FIGS. 16 to 18, the block main body 7112A has a plane shape that is smaller than that of the heat-absorbing-side heat conductive member 7111 and larger than that of the peltier element 7113.

As shown in FIGS. 16 to 18, the bulged portion 7112B has a plane shape that is smaller than that of the block main body 7112A and substantially equal to that of the peltier element 7113.

In the stepped block 7112, the block main body 7112A is connected to the heat-absorbing-side heat conductive member 7111 in a heat conductive manner; and the bulged portion 7112B is connected to the heat absorbing surface 7113A of the peltier element 7113 in a heat conductive manner.

In the first exemplary embodiment, the stepped block 7112 is set to have a thickness (that is obtained by adding a thickness of the block main body 7112A to a thickness of the bulged portion 7112B), the thickness being equal to or larger than 15 mm and equal to or smaller than 30 mm.

The heat-transfer inhibiting member 7114 is formed of a low-heat-conductive material (see Table 1 below). The heat-transfer inhibiting member 7114 is disposed between the heat-absorbing-side heat conductive member 7111 and the heat-releasing-side heat conductive member 7115 to hold the stepped block 7112 and the peltier element 7113.

As shown in FIGS. 16 to 18, the heat-transfer inhibiting member 7114 is provided with a dented portion 7114A that is dented on the plus X axis direction side (the cooling fan 714 side), the dented portion 7114A engageable with the block main body 7112A of the stepped block 7112. As shown in FIG. 18, a height of the dented portion 7114A is set to be substantially equal to the thickness of the block main body 7112A.

As shown in FIGS. 16 to 18, an opening portion 7114B is formed in a bottom surface portion of the dented portion 7114A of the heat-transfer inhibiting member 7114, the opening portion 7114B being engageable with the bulged portion 7112B of the stepped block 7112.

In addition, the heat-transfer inhibiting member 7114 is provided with a holding portion 7114C that has a frame-like shape protruding from a circumferential end portion of the opening portion 7114B toward the plus X axis direction side (the cooling fan 714 side), the holding portion 7114C holding an outer end portion of the peltier element 7113 by an inner portion of the frame-like shape. As shown in FIG. 18, a protruding dimension of the holding portion 7114C is set to be substantially equal to or smaller than a sum of the thickness of the bulged portion 7112B and the thickness of the peltier element 7113. The surface 7113A of the peltier element 7113 is in secure contact with a plate body 7115A of the heat-releasing-side heat conductive member 7115. The surface 7113B of the peltier element 7113 is in secure contact with the bulged portion 7112B of the stepped block 7112.

According to the above-described arrangement, when the peltier unit 711 is assembled, the heat-transfer inhibiting member 7114 is disposed so as to cover outer ends of the stepped block 7112 and the peltier element 7113 as shown in FIG. 18.

The heat-releasing-side heat conductive member 7115 is formed of the high-heat-conductive material (see Table 1 below) and is connected to the heat releasing surface 7113B of the peltier element 7113 in a heat conductive manner. As shown in FIGS. 16 to 18, similarly to the heat-absorbing-side heat conductive member 7111, the heat-releasing-side heat conductive member 7115 is formed of the heat sink having the plate body 7115A and a plurality of heat-releasing-side fin members 7115B. As shown in FIGS. 16 to 18, the plurality of heat-releasing-side fin member 7115B extends in a direction intersecting the extending direction of the plurality of heat-absorbing-side fin members 7111B of the heat-absorbing-side heat conductive member 7111. In the first exemplary embodiment, the plurality of heat-releasing-side fin member 7115B extends in a direction orthogonal to the extending direction of the plurality of heat-absorbing-side fin members 7111B (the Z axis direction).

In the first exemplary embodiment, surface areas of the heat-absorbing-side heat conductive member 7111 and the heat-releasing-side heat conductive member 7115 are set to be substantially equal.

The heat-absorbing-side duct 712 is formed of the low-heat-conductive material (see Table 1 below). As shown in FIG. 15, the heat-absorbing-side duct 712 has a substantially U-shape in cross section, the heat-absorbing-side duct 712 extending in the Y axis direction so as to enclose the plurality of heat-absorbing-side fin members 7111B of the heat-absorbing-side heat conductive member 7111. A U-shaped tip end of the heat-absorbing-side duct 712 is connectable with the plate body 7111A of the heat-absorbing-side heat conductive member 7111. When the heat-absorbing-side duct 712 is connected with the plate body 7111A, the plurality of heat-absorbing-side fin members 7111B is disposed on an inner portion of the U-shape. As shown in FIG. 15, a flow path C1 is formed by the heat-absorbing-side duct 712 in which air can flow in the extending direction of the plurality of heat-absorbing-side fin members 7111B. The flow path C1 is a part of air flow passage in the sealed structure. Specifically, while the air circulates in the flow path C1 (a heat-transferring path) from the plurality of heat-absorbing-side fin members 7111B through the plate body 7111A and the stepped block 7112 to the heat absorbing surface 7113A of the peltier element 7113, heat in the air is absorbed by the heat absorbing surface 7113A of the peltier element 7113.

The heat-releasing-side duct 713 is formed of the high-heat-conductive material (see Table 1 below). As shown in FIG. 15, the heat-releasing-side duct 713 is interposed between the cooling fan 714 and the peltier unit 711, the heat-releasing-side duct 713 guiding air that is sent via the peltier unit 711 from the cooling fan 714 in a predetermined direction. Specifically, although partially omitted in FIG. 15, the heat-releasing-side duct 713 has a shape covering three sides of the plus Z axis direction side, the plus Y axis direction side and the plus X axis direction side of the heat-releasing-side heat conductive member 7115. As shown in FIG. 15, a cutout 7131 is formed in a surface on the plus X axis direction side (a surface facing the heat-releasing-side fin member 7115B) of the heat-releasing-side duct 713. As shown in FIG. 15, on a circumferential end portion of the cutout 7131, connecting portions 7132 are provided, which are to be connected with a fan attaching member 714A for attaching the cooling fan 714 in the exterior casing 2. As shown in FIG. 15, the heat-releasing-side duct 713 guides air blown by the cooling fan 714 onto the heat-releasing-side fin member 7115B on the minus Z axis direction side.

Figure 19:
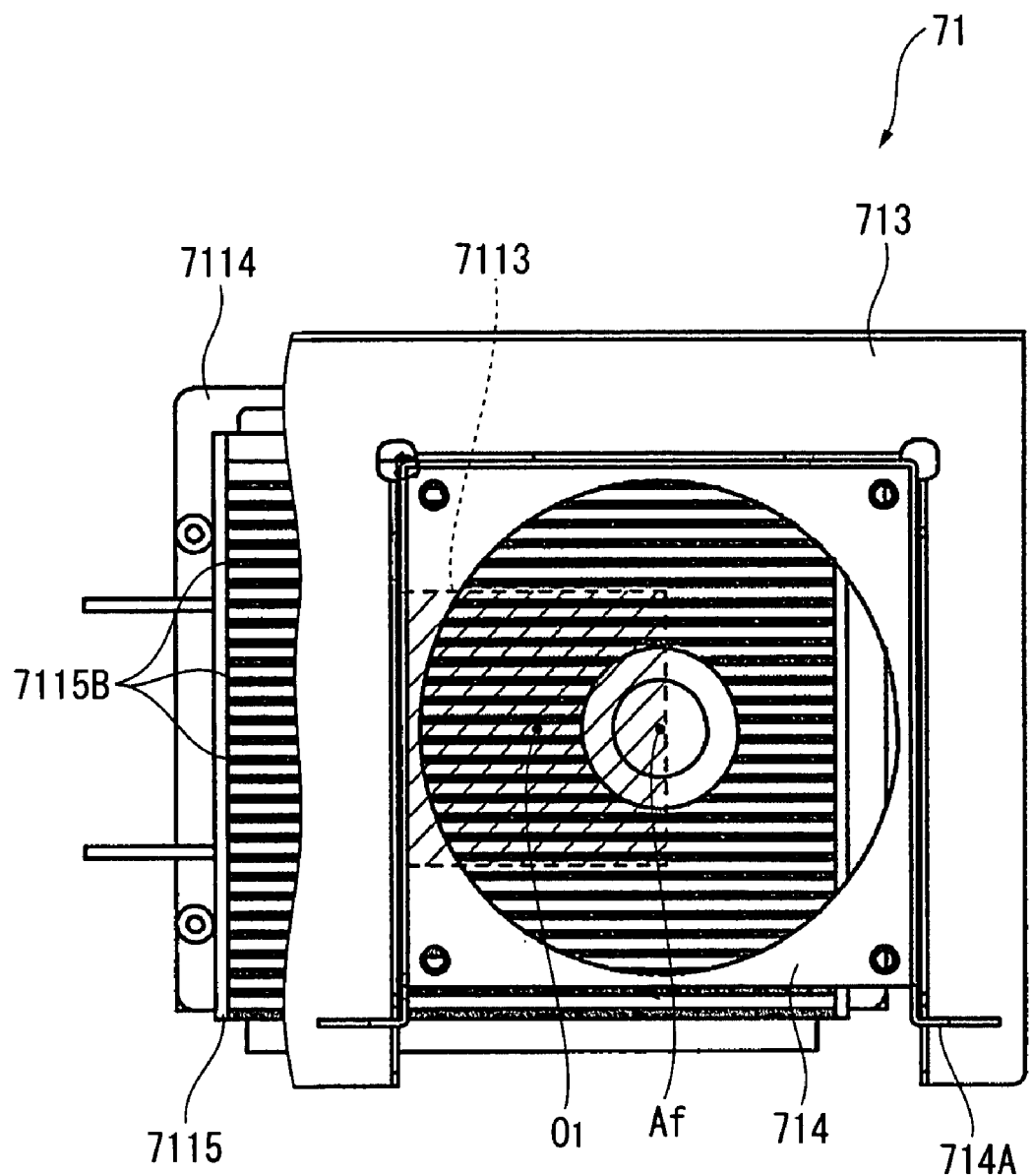
FIG. 19 is a plan view showing a position of a cooling fan relative to a heat-releasing-side heat conductive member of the first exemplary embodiment.

FIG. 19 is a plan view showing a position of the cooling fan 714 relative to the heat-releasing-side heat conductive member 7115.

As shown in FIG. 15 or 19, the cooling fan 714 includes an axial-flow fan that sucks and ejects air in a fan rotation axis $A_f$ direction, the cooling fan 714 disposed so as to face the heat-releasing-side heat conductive member 7115. More specifically, as shown in FIG. 19, the cooling fan 714 is disposed so as to face the heat-releasing-side heat conductive member 7115 such that a fan rotation axis $A_f$ is displaced, when seen in plan view, from a center position $O_1$ of the peltier element 7113 connected with the heat-releasing-side heat conductive member 7115. The cooling fan 714 is disposed so as to face the cooling-device air inlet 224 formed in the exterior casing 2. The cooling fan 714 drives under the control of the control board 6 to suck air outside the exterior casing 2 through the cooling-device air inlet 224 and ejects the air to the plurality of the heat-releasing-side fin member 7115B of the heat-releasing-side heat conductive member 7115. Specifically, hear transferred from the heat releasing surface 7113B of the peltier element 7113 through the plate body 7115A and the plurality of heat-releasing-side fin members 7115B to the plurality of heat-releasing-side fin members 7115B is cooled by the cooling fan 714.

2-3-2 Structure of Flow-Path-Upstream-Side Duct Member

The flow-path-upstream-side duct member 73 is formed of the low-heat-conductive material (see Table 1 below). The flow-path-upstream-side duct member 73 guides air circulated in the flow path C1 via the cooling device 71 to the circulation fan 72. The flow-path-upstream-side duct member 73 also guides the air ejected by the circulation fan 72 to the spaces Ar1, Ar2. As shown in FIGS. 6 and 12 to 14, the flow-path-upstream-side duct member 73 includes a base plate 731 and the duct main body 732 (FIG. 6, FIG. 12).

As shown in FIGS. 6 and 12 to 14, the base plate 731 is attached with a predetermined space to an end surface in the minus Y axis direction of the component-accommodating-portion main body 4612 of the optical component casing 46, the space being, for example, about 5 to 10 mm, the base plate 731 supporting the circulation fan 72 and the duct main body 732. As shown in FIGS. 13 and 14, the base plate 731 has a substantially T-shape in plan view. More specifically, the base plate 731 extends in the Z axis direction from the lower side of the projection lens 3 toward a position corresponding to the position of the optical device 45 in the optical component casing 46. An end portion of the base plate 731 in the minus Z axis direction extends in the X axis direction toward a position corresponding to the position of the polarization converter 423 and the opposite side of the position of the polarization converter 423.

As shown in FIG. 13 or 14, a portion of the base plate 731 on the lower side of the projection lens 3 serves as a first attaching portion 7311 for attaching the circulation fan 72. As shown in FIG. 13 or 14, a portion of the base plate 731 which protrudes in the plus X axis direction from a position corresponding to the position of the optical device 45 serves as a second attaching portion 7312 for attaching the circulation fan 72.

The circulation fan 72 circulates air in the ringed air flow passage in the sealed structure. As shown in FIG. 13, the circulation fan 72 includes a first sirocco fan 721 and a second sirocco fan 722. As shown in FIG. 13, the first sirocco fan 721 is attached to the first attaching portion 7311 of the base plate 731 such that an air inlet 7211 is oriented toward the minus Y axis direction side and an air outlet 7212 is oriented toward the minus Z axis direction side. As shown in FIG. 13, the second sirocco fan 722 is attached to the second attaching portion 7312 of the base plate 731 such that an air inlet 7221 is oriented toward the minus Y axis direction side and an air outlet 7222 is oriented toward the minus Z axis direction side and inclined toward the minus X axis direction side by a predetermined angle relative to the XY plane.

As shown in FIG. 13 or 14, in the base plate 731, opening portions 7313R, 7313G, 7313B respectively corresponding to the opening portions 4612R, 4612G, 4612B formed in the optical component casing 46 are formed at positions corresponding to the position of the optical device 45.

As shown in FIG. 13 or 14, in the base plate 731, an opening portion 7314P corresponding to the opening portions 4612P formed in the optical component casing 46 is formed at a position corresponding to the position of the polarization converter 423.

Since the duct main body 732 is attached to an end surface of the base plate 731 in the minus Y axis direction, the duct main body 732 can guide the air circulated in the flow path C1 via the cooling device 71 to the circulation fan 72 and the air ejected from the circulation fan 72 to the spaces Ar1, Ar2. As shown in FIG. 6 or 12, the duct main body 732 includes a base body 7321 and the cover member 7322 (FIG. 6).

As shown in FIG. 12, the base body 7321 has a substantially common plane shape to that of the base plate 731. A first duct portion 7321A and a second duct portion 7321B integrally form the base body 7321.

The first duct portion 7321A guides air that is circulated in the flow path C1 via the cooling device 71 to the circulation fan 72. As shown in FIG. 12, the first duct portion 7321A includes a partition wall 7321A1 that planarly covers the heat-absorbing-side duct 712 of the cooling device 71 and the circulation fan 72 when the sealed circulating-air-cooling unit 7 is assembled. The partition wall 7321A1 is formed in a container-like shape having an opening portion 7321A2 on the minus Y axis direction side.

As shown in FIG. 12, an opening portion 7321A3 is formed in the first duct portion 7321A on a position corresponding to the heat-absorbing-side duct 712 of the cooling device 71, the opening portion 7321A3 communicating with the flow path C1.

As shown in FIG. 12, opening portions 7321A4, 7321A5 are formed in the first duct portion 7321A at positions respectively corresponding to the air inlets 7211, 7221 of the sirocco fans 721 and 722 of the circulation fan 72.

As shown in FIG. 12, a flow adjusting rib 7321A6 is provided on the first duct portion 7321A between the opening portions 7321A4, 7321A5 so as to extend from the partition wall 7321A1 toward the opening portion 7321A3.

As shown in FIG. 12, a heat-releasing-wind controller 7321A7 in a rectangular shape in plan view is provided on the first duct portion 7321A at a position corresponding to the heat-releasing-side duct 713 of the cooling device 71, the heat-releasing-wind controller 7321A7 extending from the partition wall 7321A1 in the plus X axis direction. Accordingly, when the sealed circulating-air-cooling unit 7 is assembled, the heat-releasing-wind controller 7321A7 is connected with the heat-releasing-side duct 713 of the cooling device 71. The heat-releasing-wind controller 7321A7 and the heat-releasing-side duct 713 guide air that is blown onto the heat-releasing-side fin member 7115B by the cooling fan 714 in the minus Z axis direction.

As shown in FIG. 12, a circumferential end portion of the opening portion 7321A4 of the first duct portion 7321A serves as a first attaching portion 7321A8 for attaching the first sirocco fan 721 of the circulation fan 72. The first sirocco fan 721 is sandwiched and fixed by the first attaching portion 7311 of the base plate 731 and the first attaching portion 7321A8 of the duct main body 732.

As shown in FIG. 12, a circumferential end portion of the opening portion 7321A5 of the first duct portion 7321A serves as a second attaching portion 7321A9 for attaching the second sirocco fan 722 of the circulation fan 72. The second sirocco fan 722 is sandwiched and fixed by the second attaching portion 7312 of the base plate 731 and the second attaching portion 7321A9 of the duct main body 732.

As shown in FIG. 6, the cover member 7322 is attached to the partition wall 7321A1 of the first duct portion 7321A and closes the opening portion 7321A2.

As shown in FIG. 12, since the cover member 7322 is attached to the first duct portion 7321A, air circulated in the flow path C1 is introduced through the opening portion 7321A3 to a space between the first duct portion 7321A and the cover member 7322. The flow adjusting rib 7321A6 forms the flow path C2 guiding the air to the opening portion 7321A4 (the first sirocco fan 721) and the flow path C3 guiding the air to the opening portion 7321A5 (the second sirocco fan 722). The flow paths C2, C3 form a part of the air flow passage in the sealed structure.

The second duct portion 7321B guides the air that is circulated in the flow paths C2, C3 and sucked and ejected to the sirocco fans 721, 722 to the spaces Ar1, Ar2 in the optical component casing 46. As shown in FIG. 6 or 12, the second duct portion 7321B has a substantially L-shape in plan view in which the second duct portion 7321B extends from a position corresponding to the position of the optical device 45 in the minus Z axis direction and extends to a position corresponding to the position of the polarization converter 423 in the minus X axis direction, forming a container-like shape in plan view with an opening on the plus Y axis direction side.

Although not specifically shown, a cutout connecting with the air outlet 7212 of the first sirocco fan 721 and a cutout connecting with the air outlet 7222 of the second sirocco fan 722 are formed in a lateral wall portion of the container-like shape.

Although not specifically shown, the second duct portion 7321B is provided with a flow adjusting rib that guides to a predetermined portion the air ejected from the first sirocco fan 721 and the second sirocco fan 722.

As shown in FIG. 13, the duct main body 732 attached to the base plate 731 guides the air that is circulated in the flow path C2 and sucked and ejected by the first sirocco fan 721 to a space between the second duct portion 7321B and the base plate 731. The flow adjusting rib forms a flow path C4 that guides the air to the space Ar1 via the opening portions 7313R, 7313B of the base plate 731 and the opening portions 4612R, 4612B of the optical component casing 46. In addition, as shown in FIG. 13, air that is circulated in the flow path C3 and sucked and ejected by the second sirocco fan 722 to a space between the second duct portion 7321B and the base plate 731. The flow adjusting rib forms a flow path C5 that guides the air to the space Ar1 via the opening portion 7313G of the base plate 731 and the opening portion 4612G of the optical component casing 46. The flow adjusting rib also forms a flow path C6 that guides the air to the space Ar2 via the opening portion 7314P of the base plate 731 and the opening 4612P of the optical component casing 46. The flow paths C4 to C6 form a part of the air flow passage in the sealed structure.

2-3-3 Structure of Flow-Path-Downstream-Side Duct Member

The flow-path-downstream-side duct member 74 is a member that guides air flown to the outside of the spaces Ar1, Ar2 from the inside of the spaces Ar1, Ar2 to the heat-absorbing-side duct 712 (the flow path C1) of the cooling device 71. As shown in FIG. 10 or 11, the flow-path-downstream-side duct member 74 includes the low-heat-conductive duct portion 741 and the high-heat-conductive duct portion 742 (FIG. 10).

The low-heat-conductive duct portion 741 is formed of the low-heat-conductive material (see Table 1 below). As shown in FIG. 10, the low-heat-conductive duct portion 741 includes a partition wall 7411 that planarly covers an open portion of the heat-absorbing-side duct 712 of the cooling device 71 on the plus Y axis direction side and the component-accommodating-portion main body 4612 of the optical component casing 46, forming a substantially L-shape container-like shape in plan view having an opening portion 7412 on the plus Y axis direction side. As shown in FIG. 11, the low-heat-conductive duct portion 741 is attached to an end surface of the heat-absorbing-side duct 712 in the plus Y axis direction and an end surface of the lid-like member 462 in the plus Y axis direction with a predetermined distance (for example, about 5 to 10 mm).

The flow-path-downstream-side duct member 74 is provided with a hole in which a FPC cable 456 for connecting the liquid crystal panels 451 with the control board 6 is inserted. A gap between the hole and the FRC cable 456 is filled with rubber, sponge and the like to prevent degradation in sealing property of the flow-path-downstream-side duct member 74.

As shown in FIG. 11, an opening portion 7413 is formed in the low-heat-conductive duct portion 741 at a position corresponding to the heat-absorbing-side duct 712, the opening portion 7413 communicating with the flow path C1.

As shown in FIG. 11, an opening portion 7414 is formed in the low-heat-conductive duct portion 741 at a position corresponding to the cutout 4621 of the lid-like member 462, the opening portion 7414 communicating with the space Ar1 via the cutout 4621.

As shown in FIG. 11, an opening portion 7415 is formed in the low-heat-conductive duct portion 741 at a position corresponding to the opening portion 4622 of the lid-like member 462, the opening portion 7415 communicating with the space Ar2 via the opening portion 4622.

As shown in FIG. 11, a flow adjusting rib 7416 is provided to the low-heat-conductive duct portion 741, the flow adjusting rib 7416 extending from the partition wall 7411 to the opening portion 7412 and separating the opening portions 7414, 7415.

The high-heat-conductive duct portion 742 is formed of the high-heat-conductive material (see Table 1 below). As shown in FIG. 10, the high-heat-conductive duct portion 742 is a member that is attached to the partition wall 7411 of the low-heat-conductive duct portion 741 and closes the opening portion 7412.

Since the high-heat-conductive duct portion 742 is attached to the low-heat-conductive duct portion 741, the flow paths C7 and C8 are formed as shown in FIG. 11, the flow path C7 introducing air that is flown to the outside of the space Ar1 from the inside of the space Ar1 to the inside of the flow-path-downstream-side duct member 74 via the cutout 4621 and the opening portion 7413, the flow path C7 also guiding the air to the heat-absorbing-side duct 712 (the flow path C1) via the opening portion 7413, the flow path C8 introducing air flown to the outside of the space Ar2 from the inside of the space Ar2 to the inside of the flow-path-downstream-side duct member 74 via the opening portions 4622 and 7415, the flow path C8 also guiding the air to the heat-absorbing-side duct 712 (the flow path C1) via the opening portion 7413. The flow paths C7, C8 form a part of the air flow passage in the sealed structure.

The above-described flow paths C1 to C8 and the spaces Ar1 and Ar2 form the ringed air flow passage in the sealed structure. By circulating air through the ringed air flow passage from the flow path C1 to the flow path C2, the flow path C3 via the flow paths C4, C5 and C6 to the spaces Ar1, Ar2 to the flow path C7, the flow path C8 to the flow path C1, the optical device 45 (the liquid crystal panels 451, the incident-side polarization plates 452, the irradiation-side polarization plate 454 and the like) in the spaces Ar1, Ar2 and the polarization converter 423 are cooled.

Although not specifically shown, the optical component casing 46 and the sealed circulating-air-cooling unit 7 each have a sealed structure in which the air flow passage is not in communication with the outside by, for example, providing an elastic sealing member and the like between the components.

The above-described high-heat-conductive material and low-heat-conductive material may be one exemplified in Table 1 below. As shown in Table 1, the high-heat-conductive material may preferably have a heat conductivity of 42 W/(m·K) or higher. The low-heat-conductive material may preferably have a heat conductivity of 0.9 W/(m·K) or lower.

TABLE 1

| | | Material Name | Heat Conductivity (W/(m · K)) |
|---|---|---|---|
| High-Heat-Conductive Material | Metal | Iron (Fe) | 80 |
| | | Alminum (Pure Al) | 237 |
| | | Copper (Pure Cu) | 398 |
| | | A5052 (Al Alloy) | 138 |
| | | ADC12 (Al Alloy) | 96 |
| | | AZ91D (Mg Alloy) | 72 |
| | | Carbon Steel | 42 |
| | | SUS (Stainless Steel) | 16 |
| Low-Heat-Conductive Material | Resin | Acryl | 0.21 |
| | | Epoxy | 0.3 |
| | | Polycarbonate | 0.23 |
| | | ABS | 0.9 |
| | | Polypropylene | 0.2 |
| | Heat Insulating Material | Glass Wool | 0.034 |
| | | Foamed Polystyrene | 0.038 |
| | | Rigid Urethane Foam | 0.018 |

2-4 Structure of Inside-Casing Cooling Device

The inside-casing cooling device 8 cools components outside the sealed structure (the control board 6, the flow-path-downstream-side duct member 74, the light source device 41, the power source unit 5 and the like). As shown in FIGS. 4 to 6, the inside-casing cooling device 8 includes the peltier heat releasing air outlet unit 81 (FIG. 4, FIG. 5), a light-source cooling fan 82 (FIG. 6), a power-source cooling fan 83 and an exhaust fan 84.

The peltier heat releasing air outlet unit 81 circulates air blown from the cooling fan 714 onto the heat-releasing-side fin member 7115B of the heat-releasing-side duct 713 to a position between the control board 6 and the flow-path-downstream-side duct member 74. As shown in FIG. 4 or 5, the peltier heat releasing air outlet unit 81 includes an outer-side duct portion 811 and a wind guiding portion 812.

Figure 20:
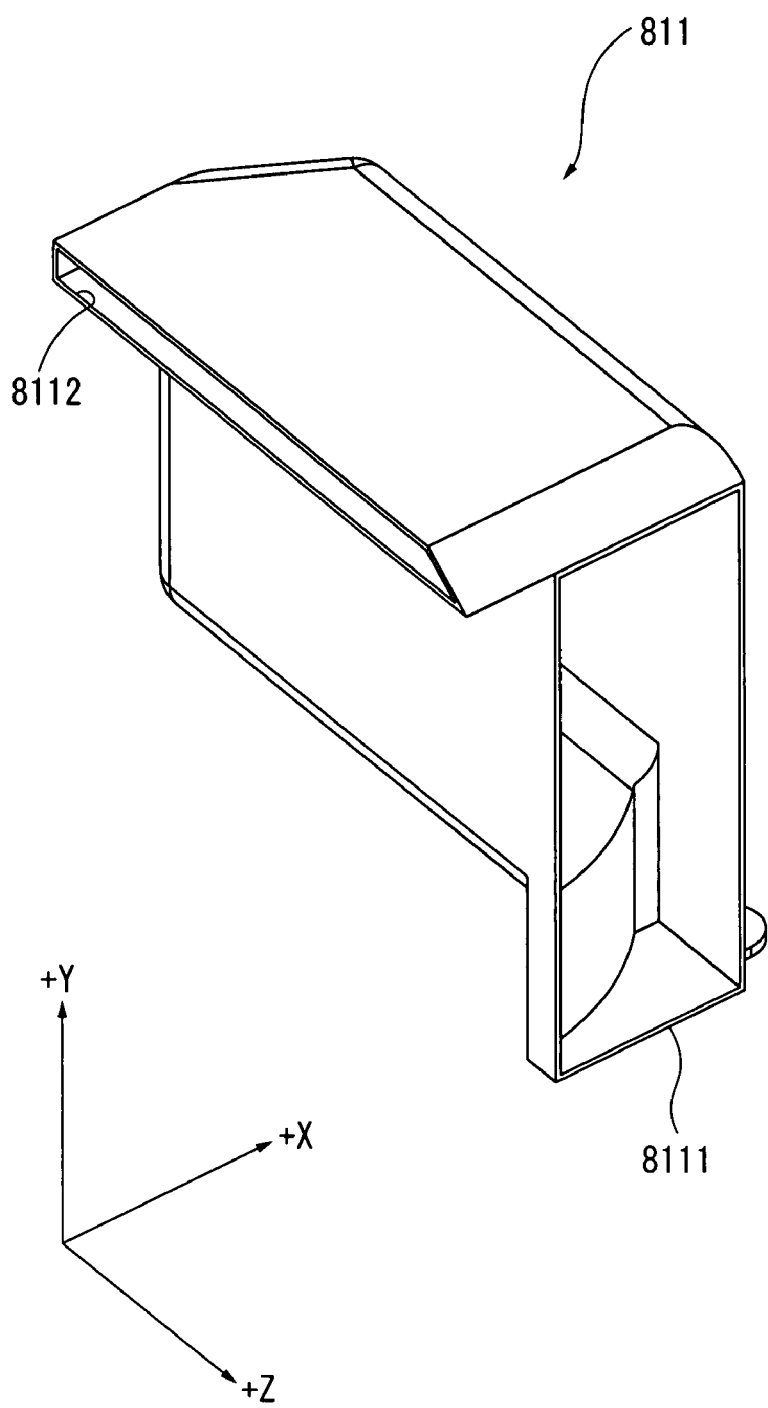
FIG. 20 is a perspective view showing an outer-side duct member of the first exemplary embodiment.

FIG. 20 is a perspective view showing the outer-side duct portion 811.

As shown in FIG. 20, the outer-side duct portion 811 is adapted such that an introduction hole 8111 introducing air into the outer-side duct portion 811 and an outflow hole 8112 exhausting the air inside to the outside of the outer-side duct portion 811 are substantially orthogonal to each other and the air introduced into the outer-side duct portion 811 through the introduction hole 8111 is bent in the plus Y axis direction and then bent toward the outflow hole 8112 for circulation. Although not specifically shown, the outer-side duct portion 811 is disposed such that the introduction hole 8111 is connected with a rear lateral end of the heat-releasing-side duct 713 and a rear lateral end of the heat-releasing-wind controller 7321A7. As shown in FIG. 4 or 5, the outer-side duct portion 811 is disposed such that the outflow hole 8112 is positioned at a position between an end of the control board 6 (not shown in FIG. 4) in the plus X axis direction and an end of the flow-path-downstream-side duct member 74 in the plus X axis direction. The outer-side duct portion 811 introduces therein via the introduction hole 8111 the air that is blown from the cooling fan 714 onto the heat-releasing-side fin member 7115B and is guided by the heat-releasing-wind controller 7321A7 and the heat-releasing-side duct 713 in the minus Z axis direction, the outer-side duct portion 811 exhausting the air via the outflow hole 8112 to a position between the control board 6 and the flow-path-downstream-side duct member 74 from the plus X axis direction side to the minus X axis direction side.

The wind guiding portion 812 circulates the air exhausted from the outer-side duct portion 811 between the control board 6 and the flow-path-downstream-side duct member 74 along portions facing the spaces Ar1, Ar2 of the flow-path-downstream-side duct member 74. As shown in FIG. 4 or 5, the wind guiding portion 812 includes a first guide portion 8121 and a second guide portion 8122.

As shown in FIG. 4 or 5, the first guide portion 8121 is formed of a plate member. The first guide portion 8121 is vertically provided on the high-heat-conductive duct portion 742 such that an end side of the first guide portion 8121 is connected with an end of the outflow hole 8112 of the outer-side duct portion 811 in the minus Z axis direction and the other end side extends along edges in the minus Z axis direction and the minus X axis direction of the high-heat-conductive duct portion 742 of the flow-path-downstream-side duct member 74 to the vicinity of the light-source-device accommodating portion 4611.

As shown in FIG. 4 or 5, the second guide portion 8122 is formed of a plate member. The second guide portion 8122 is vertically provided on the high-heat-conductive duct portion 742 such that an end side of the second guide portion 8122 is connected with an end of the outflow hole 8112 of the outer-side duct portion 811 in the plus Z axis direction and the other end side extends in the minus X axis direction along an edge on an inner side of the L-shape of the high-heat-conductive duct portion 742 of the flow-path-downstream-side duct member 74 to the vicinity of the light-source-device accommodating portion 4611.

As shown in FIG. 4 or 5, by disposing the control board 6 on the plus Y axis direction side of the flow-path-downstream-side duct member 74 via the wind guiding portion 812, a flow path C11 is formed in which air exhausted from the outflow hole 8112 of the outer-side duct portion 811 is circulated from a portion facing the space Ar1 to a portion facing to the space Ar2.

As shown in FIG. 6, the light-source cooling fan 82 is formed of the sirocco fans. The light-source cooling fan 82 is attached on one end side of the component-accommodating-portion main body 4612 in the minus Y axis direction, the one end side connected with the light-source-device accommodating portion 4611, such that an air inlet 821 is open on the minus Y axis direction side and an air outlet 822 is open on the plus Z axis direction side. The light-source cooling fan 82 drives under the control of the control board 6, thereby sucking cooling air outside the exterior casing 2 through the light-source air inlet 223 formed in the lower case 22 and ejecting the air in the plus Z axis direction. As shown in FIG. 6, the air ejected from the light-source cooling fan 82 is introduced from an air introducing portion 4131 formed in the lamp housing 413 of the light source device 41 through the flow path C12 communicating the inside and the outside of the lamp housing 413 to the inside the lamp housing 413, thereby cooling the light source lamp 411 and the reflector 412.

As shown in FIGS. 4 to 6, the power-source cooling fan 83 is formed of the axial-flow fan. The power-source cooling fan 83 is disposed at a corner portion on the minus Z axis direction side and the minus X axis direction side in the exterior casing 2 such that an air inlet 831 is open on the minus Z axis direction and an air outlet 832 is open on the plus Z axis direction side. As shown in FIG. 4 or 5, the power-source cooling fan 83 drives under the control of the control board 6, thereby sucking cooling air outside the exterior casing 2 through the power-source air inlet 225 formed in the exterior casing 2 and ejecting the air in the plus Z axis direction. As shown in FIGS. 4 to 6, the air ejected from the power-source cooling fan 83 is introduced by the shield member 51 of the power source unit 5 through a flow path C13 communicating the inside and the outside of the shield member 51 to the inside the shield member 51 through an open portion of the shield member 51 on the minus Z axis direction side, thereby cooling the power source block or the lamp driving block.

As shown in FIGS. 4 to 6, the exhaust fan 84 is formed of the axial-flow fan. The exhaust fan 84 is disposed at a corner portion on the plus Z axis direction side and the minus X axis direction side in the exterior casing 2 such that an air inlet 841 (FIG. 6) is open in the minus Z axis direction and inclined toward the plus X axis direction side with a predetermined angle relative to the XY plane. The exhaust fan 84 drives under the control of the control board 6 to suck air in the vicinity of the exhaust fan 84.

For example, as shown in FIG. 4 or 5, the exhaust fan 84 sucks air circulated by the peltier heat releasing air outlet unit 81 through the flow path C11 to the vicinity of the light-source-device accommodating portion 4611.

For another example, as shown in FIG. 5 or 6, the exhaust fan 84 sucks air inside the light-source-device accommodating portion 4611 through an opening portion (not shown) formed in an end surface in the minus X axis direction of the light-source-device accommodating portion 4611. In other words, the exhaust fan 84 sucks the air that is introduced by the light-source cooling fan 82 through the flow path C12 to the inside of the lamp housing 413 and heated by the light source lamp 411 and the reflector 412 as well as the air flown through the opening portion 4611B formed in an end surface in the plus X axis direction of the light-source-device accommodating portion 4611 into the light-source-device accommodating portion 4611.

For another example, as shown in FIGS. 4 to 6, the exhaust fan 84 sucks air inside the shield member 51 through an open portion in the shield member 51 on the plus Z axis direction side. In other words, the air introduced by the power-source cooling fan 83 through the flow path C13 to the inside of the shield member 51 and heated by the power source block or the lamp driving block is sucked by the exhaust fan 84.

The air ejected by the exhaust fan 84 is flow-adjusted by the louver 234 while flowing through the exhaust opening 233 of the exterior casing 2 and exhausted to the outside of the exterior casing 2.

2-5 Structure of Control Board

As shown in FIG. 3, the control board 6 is a circuit board on which a circuit element such as a CPU (Central Processing Unit) is provided. The control board 6 is disposed on the upper side of the optical unit 4 via the flow-path-downstream-side duct member 74 and the wind guiding portion 812. The control board 6 controls the optical unit 4 (the light source lamp 411, the liquid crystal panels 451), the power source unit 5, the sealed circulating-air-cooling unit 7 (the circulation fan 72, the peltier element 7113, the cooling fan 714), the inside-casing cooling device 8 (the light-source cooling fan 82, the power-source cooling fan 83, the exhaust fan 84) and the like.

The above-described first exemplary embodiment can provide following exemplary advantages.

In the first exemplary embodiment, in the cooling device 71, since the heat absorbing surface 7113A of the peltier element 7113 is connected with the heat-absorbing-side heat conductive member 7111 in a heat conductive manner and the heat-absorbing-side heat conductive member 7111 is provided with the plurality of heat-absorbing-side fin members 7111B, a surface area of the heat-absorbing-side heat conductive member 7111 can be larger than that of a related-art plate-like heat transfer member. Accordingly, a heat absorption amount of heat transferred from the air circulating in the to-be-cooled air flow passage (the flow path C1) via the heat-absorbing-side heat conductive member 7111 to the heat absorbing surface 7113A of the peltier element 7113 can be comparatively large. In addition, in the cooling device 71, a ratio of the amount of heat transferred from the air circulating in the flow path C1 to power consumption of the peltier element 7113 (the heat absorption efficiency) can be enhanced.

Since the heat absorption efficiency can be enhanced, the rotational speed of the cooling fan 714 can be restrained from being unnecessarily increased, thereby contributing to noise-reduction of the projector 1. In addition, the power consumption of the peltier element 7113 can be also restrained from being unnecessarily increased, thereby contributing to power-saving of the projector 1.

Figure 21A:
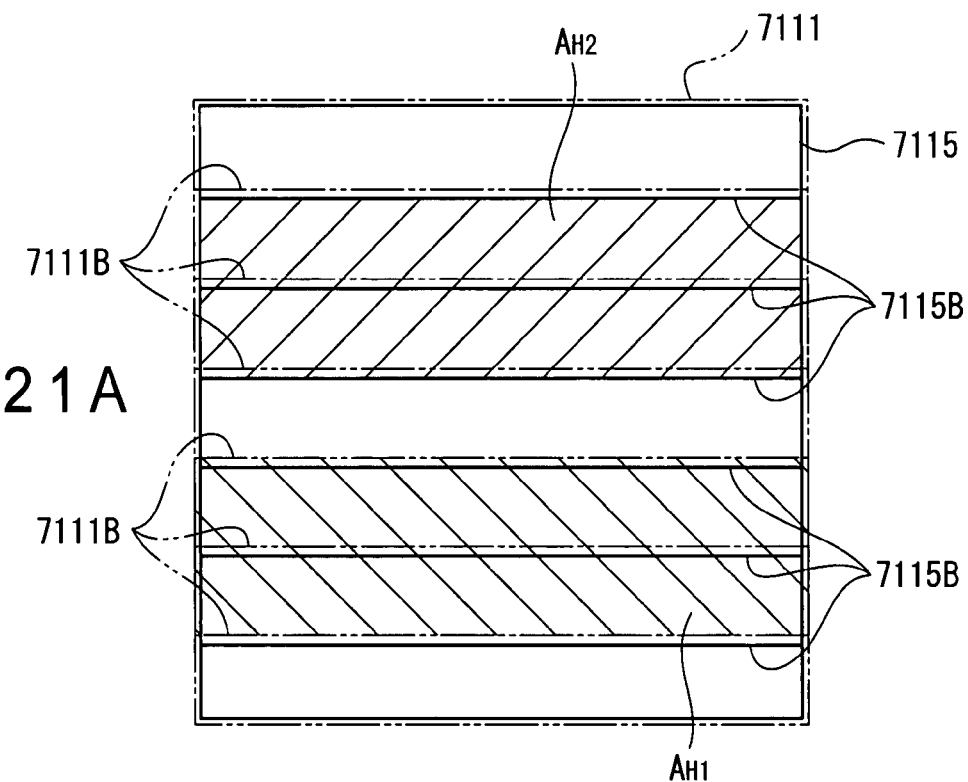
FIG. 21A explains an effect of the first exemplary embodiment.
Figure 21B:
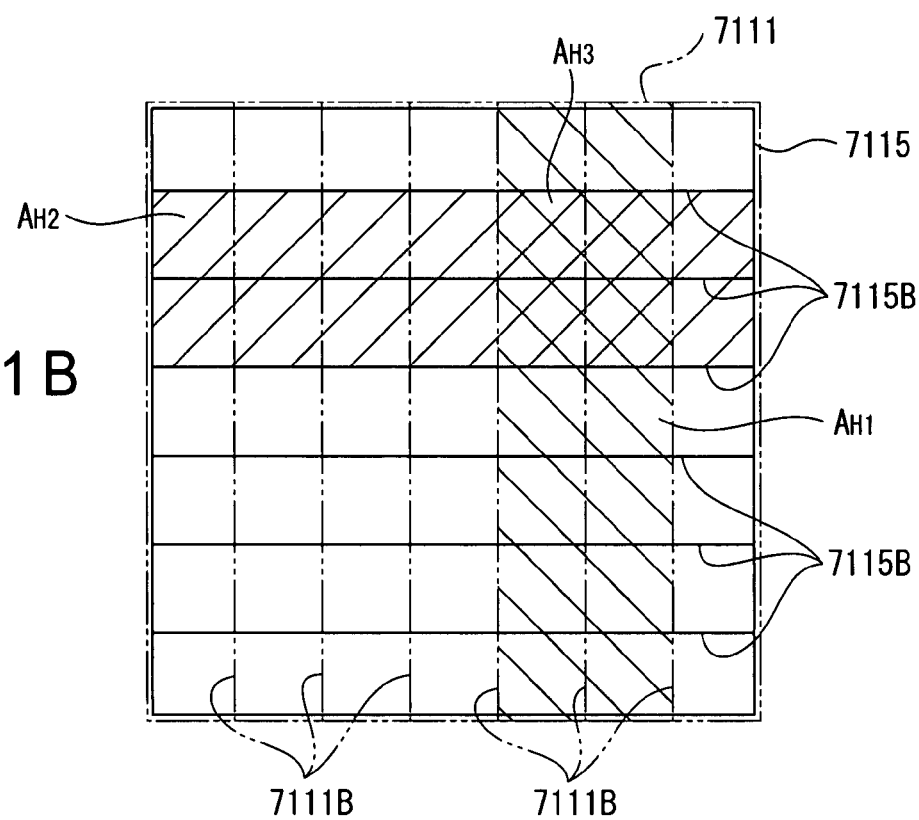
FIG. 21B explains an effect of the first exemplary embodiment.

FIG. 21A is an illustration explaining an advantage of the first exemplary embodiment. Specifically, FIG. 21A is a plan view schematically showing a case where the extending direction of the plurality of heat-absorbing-side fin members 7111B is set to the same as that of the plurality of heat-releasing-side fin member 7115B. FIG. 21B is an illustration explaining an advantage of the first exemplary embodiment. Specifically, FIG. 21B is a plan view schematically showing structures of the plurality of heat-absorbing-side fin members 7111B and the plurality of heat-releasing-side fin member 7115B of the first exemplary embodiment.

Note that when air speed varies among the plurality of heat-absorbing-side fin members 7111B, an amount of heat absorbed from the air flowing between two fin members 7111B out of the plurality of heat-absorbing-side fin members 7111B may be larger than that between other two fin members 7111B. In other words, as exemplified in FIGS. 21A and 21B, large heat-absorption-amount portions $AH_1$ and other small heat-absorption-amount portions exist in the plurality of heat-absorbing-side fin members 7111B, causing variations in the heat absorption amount.

Similarly, when air speed varies between the plurality of heat-releasing-side fin members 7115B, an amount of heat released to the air passing between two heat-releasing-side fin members 7115B out of the plurality of heat-releasing-side fin members 7115B may be larger than that between other fin members 7115B. In other words, as exemplified in FIGS. 21A and 21B, large heat-releasing-amount portions $AH_2$ and the other small heat-releasing-amount portions exist in the plurality of heat-releasing-side fin members 7115B, causing variations in heat releasing amount.

As exemplified in FIG. 21A, when the extending direction of the plurality of heat-absorbing-side fin members 7111B is set to the same as that of the plurality of heat-releasing-side fin member 7115B, the large heat-absorption-amount portions $AH_1$ of the heat-absorbing-side heat conductive member 7111 may not be planarly superposed with the large heat-releasing-amount portions $AH_2$ of the heat-releasing-side heat conductive member 7115. In such a case, heat is transferred from the large heat-absorption-amount portions $AH_1$ of the heat-absorbing-side heat conductive member 7111 to the other small heat-releasing-amount portions excluding the portions $AH_2$ in the heat-releasing-side heat conductive member 7115, so that sufficient heat absorption efficiency can not be ensured in the cooling device 71.

In the first exemplary embodiment, the extending direction of the plurality of heat-absorbing-side fin members 7111B is orthogonal in plan view to that of the plurality of heat-releasing-side fin member 7115B. Accordingly, even in the above-described case, a portion $AH_3$ can be reliably formed in which a part of the large heat-absorption-amount portions $AH_1$ of the heat-absorbing-side heat conductive member 7111 is planarly superposed with a part of the large heat-releasing-amount portions $AH_2$ of the heat-releasing-side heat conductive member 7115. Hence, in the portion $AH_3$, heat is transferred from a large heat-absorption-amount portion of the heat-absorbing-side heat conductive member 7111 to a large heat-releasing-amount portion in the heat-releasing-side heat conductive member 7115, so that sufficient heat absorption efficiency can be ensured in the cooling device 71.

Since the peltier element 7113 has such a small thickness of about 4 mm, when the heat-absorbing-side heat conductive member 7111 and the heat-releasing-side heat conductive member 7115 are directly attached to the heat absorbing surface 7113A and the heat releasing surface 7113B of the peltier element 7113, the heat-absorbing-side heat conductive member 7111 and the heat-releasing-side heat conductive member 7115 are near to each other, so that heat of the heat-releasing-side heat conductive member 7115 may be easily transferred to the heat-absorbing-side heat conductive member 7111. Hence, the heat-absorbing-side fin members 7111B absorb less heat from the air circulating in the flow path C1, so that sufficient heat absorption efficiency can not be ensured in the cooling device 71.

In the first exemplary embodiment, since the stepped block 7112 having heat conductive property is interposed between the heat-absorbing-side heat conductive member 7111 and the heat absorbing surface 7113A, the heat-absorbing-side heat conductive member 7111 can be apart from the heat-releasing-side heat conductive member 7115 by a predetermined distance (by the total thickness of the stepped block 7112 and the peltier element 7113; for example, when the stepped block 7112 is set to have a thickness that is equal to or larger than 15 mm and equal to or smaller than 30 mm and the thickness of the peltier element 7113 is 4 mm, the distance will is equal to or larger than 19 mm and equal to or smaller than 34 mm). Hence, heat transfer from the heat-releasing-side heat conductive member 7115 to the heat-absorbing-side heat conductive member 7111 can be restrained, so that a heat absorption amount by which the heat-absorbing-side fin members 7111B absorbs heat from the air circulating in the flow path C1 can be maintained and sufficient heat absorption efficiency can be ensured in the cooling device 71.

In order to ensure the predetermined distance between the heat-absorbing-side heat conductive member 7111 and the heat-releasing-side heat conductive member 7115, another arrangement might be conceived in which the stepped block 7112 is interposed between the heat-releasing-side heat conductive member 7115 and the heat releasing surface 7113B. However, such an arrangement may cause following problems.

It is generally known that the heat absorption efficiency becomes better when a difference in temperature between the heat releasing surface 7113B and the heat absorbing surface 7113A of the peltier element 7113 is small. In addition, generally, when a heat absorption amount absorbed by the heat absorbing surface 7113A is defined as $Q_{ab}$, a heat releasing amount released from the heat releasing surface 7113B $Q_D$ equals to $Q_{ab}$+P because electric power (consumption power) P that is supplied to the peltier element 7113 is added. Accordingly, a transmitting heat amount of the heat absorption side is only $Q_{ab}$, but a transmitting heat amount on the heat releasing side will be a large amount of $Q_{ab}$+P. Hence, when the stepped block 7112 having a predetermined heat resistance is interposed between the heat-releasing-side heat conductive member 7115 and the heat releasing surface 7113B, the temperature of the heat releasing surface 7113B becomes large, so that it is difficult to restrain the temperature difference between the heat releasing surface 7113B and the heat absorbing surface 7113A small. In other words, it is difficult to enhance the heat absorption efficiency.

In the first exemplary embodiment, the stepped block 7112 is interposed between the heat-absorbing-side heat conductive member 7111 and the heat absorbing surface 7113A. Hence, in comparison with the above-described arrangement, since the temperature of the heat releasing surface 7113B does not increase, the temperature difference between the heat releasing surface 7113B and the heat absorbing surface 7113A can be small, thereby enhancing the heat absorption efficiency.

Further, in the cooling device 71, the heat-transfer inhibiting member 7114 formed of a low-heat-conductive material having a heat conductivity of equal to or smaller than 0.9 W/(m·K) is interposed between the heat-absorbing-side heat conductive member 7111 and the heat-releasing-side heat conductive member 7115. Hence, in addition to that the stepped block 7112 can ensure the predetermined distance between the heat-absorbing-side heat conductive member 7111 and the heat-releasing-side heat conductive member 7115, the heat transfer inhibiting member 7114 can restrain heat from transferring from the heat-releasing-side heat conductive member 7115 to the heat-absorbing-side heat conductive member 7111. Hence, the heat absorption amount of heat that is absorbed from the flow path C1 by the heat-absorbing-side fin members 7111B can be appropriately maintained, so that sufficient heat absorption efficiency can be ensured in the cooling device 71.

Further, since the heat-transfer inhibiting member 7114 is formed so as to cover the outer end portions both of the stepped block 7112 and the peltier element 7113, heat of the heat-releasing-side heat conductive member 7115 can be restrained from transferring to the stepped block 7112 or to the peltier element 7113. Hence, the heat absorption amount of heat that is absorbed from the air circulating in the flow path C1 via the heat-absorbing-side fin members 7111B and the stepped block 7112 to the heat absorbing surface 7113A can be more appropriately maintained, so that sufficient heat absorption efficiency can be ensured in the cooling device 71.

Since the cooling device 71 is provided with the heat-absorbing-side duct 712 formed of the low-heat-conductive material having the heat conductivity of equal to or smaller than 0.9 W/(m·K), heat in air or heat in a component outside the heat-absorbing-side duct 712 can be restrained from transferring to the air circulating in the flow path C1. Accordingly, the cooling device 71 can sufficiently cool the air circulating in the flow path C1.

Since the cooling device 71 is provided with the heat-releasing-side duct 713 formed of the high-heat-conductive material having the heat conductivity of equal to or larger than 42 W/(m·K), heat transferred from the heat-releasing-side fin member 7115B to the air in the heat-releasing-side duct 713 can be released via the heat-releasing-side duct 713 to the outside. Hence, heat releasing property of the heat-releasing-side fin member 7115B can be appropriate and the rotational speed of the cooling fan 714 can be restrained from being unnecessarily increased, thereby contributing to noise-reduction of the projector 1.

Note that, in the axial-flow fan, the air speed of the ejected air is larger on tip end sides of the plurality of vanes of the fan than that on the fan rotation axis $A_f$.

In the first exemplary embodiment, the cooling fan 714 is disposed so as to face the heat-releasing-side heat conductive member 7115 such that the fan rotation axis $A_f$ is displaced in plan view from the center position $O_1$ of the peltier element 7113. Accordingly, in the heat-releasing-side heat conductive member 7115, the peltier element 7113 is disposed on a portion onto which the air ejected from the cooling fan 714 is blown, the air having a large speed. Hence, in the heat-releasing-side heat conductive member 7115, the cooling fan 714 can efficiently cool a portion that is heated to a high temperature by the heat transferred from the heat releasing surface 7113B of the peltier element 7113.

Further, since the projector 1 is provided with the cooling device 71 that has the above-described enhanced heat absorption efficiency, the air circulating in the to-be-cooled air flow passage can be efficiently cooled. In other words, the optical device 45 and the polarization converter 423 accommodated in the spaces Ar1, Ar2 in the optical component casing 46 can be efficiently cooled.

Since the optical components 45, 423 are accommodated in the spaces Ar1, Ar2 in the optical component casing 46 of the sealed structure, dust, lamp black or the like can be prevented from adhering on the optical components 45, 423, thereby ensuring stable image quality in projection image projected from the projector 1.

Second Exemplary Embodiment

Next, a second exemplary embodiment of the invention will be described with reference to the attached drawings.

In the description below, the same components as those in the first exemplary embodiment are indicated by the same reference numerals for omitting or simplifying detailed description thereof.

Figure 22:
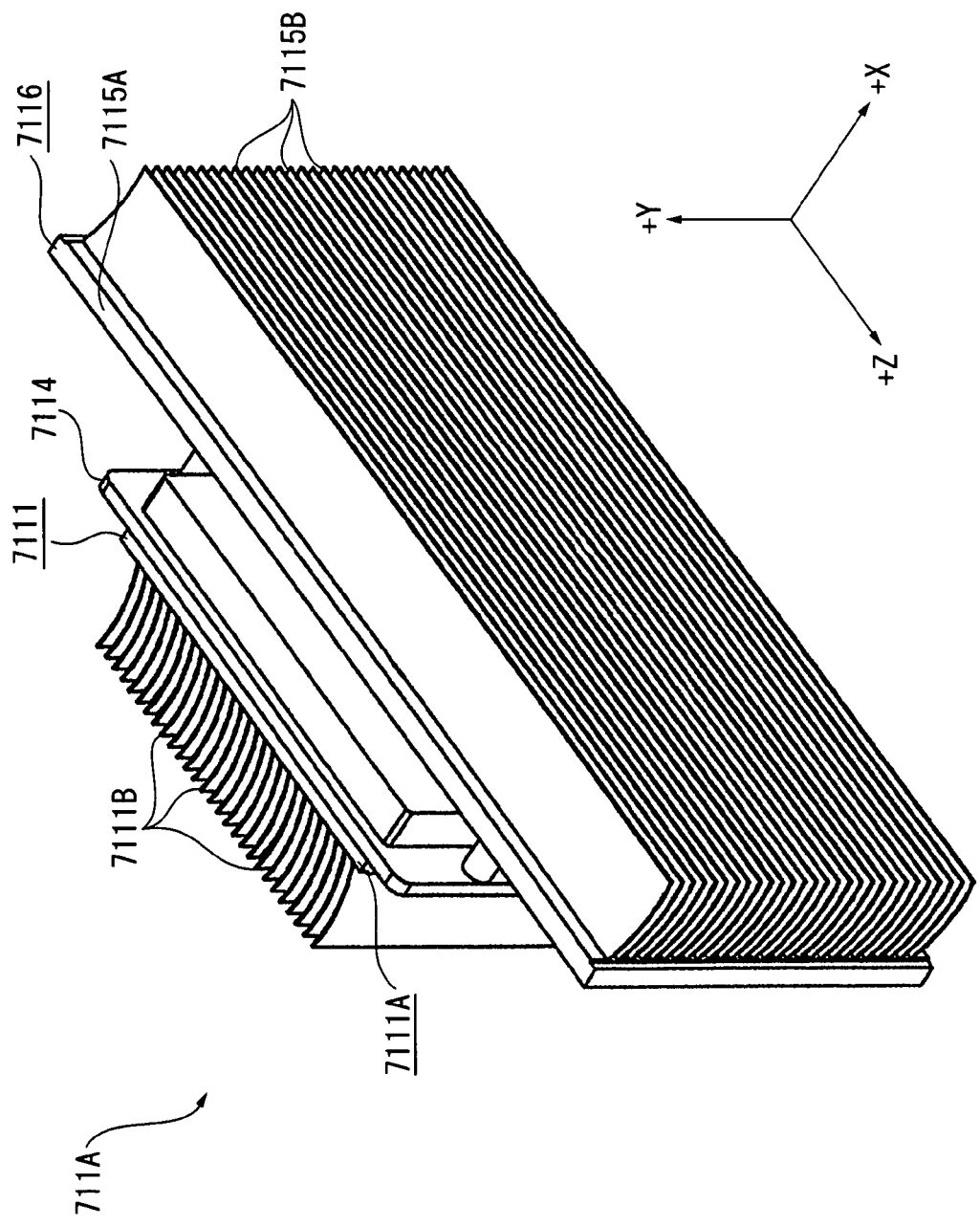
FIG. 22 shows a structure of a peltiert unit of a second exemplary embodiment.

FIG. 22 shows a structure of a peltier unit 711A of the second exemplary embodiment. Specifically, FIG. 22 is a perspective view of the peltier unit 711A when seen from the plus X axis direction side (the side remote from the projection lens 3).

The second exemplary embodiment differs from the first exemplary embodiment in a shape of a heat-releasing-side heat conductive member 7116 of the peltier unit 711A as shown in FIG. 22. The other arrangements are the same as those of the first exemplary embodiment.

As shown in FIG. 22, similarly to the heat-releasing-side heat conductive member 7115, the heat-releasing-side heat conductive member 7116 includes the plate body 7115A and the plurality of heat-releasing-side fin members 7115B. The heat-releasing-side heat conductive member 7116 has a shape longer than the heat-releasing-side heat conductive member 7115 in the Z axis direction.

More specifically, in the second exemplary embodiment, the heat-absorbing-side heat conductive member 7111 and the heat-releasing-side heat conductive member 7116 are adapted such that an expression (2) below is satisfied when the surface area of the heat-absorbing-side heat conductive member 7111 is $A_1$, the surface area of the heat-releasing-side heat conductive member 7116 is $A_2$, a heat absorption amount of the peltier element 7113 is $Q_{ab}$ and a heat releasing amount of the peltier element 7113 is $Q_D$.

$$A_1:A_2=Q_{ab}:Q_D \quad (2)$$

Note that, as exemplified in FIG. 22, $Q_{ab}:Q_D$ is 1:2.

Herein, a heat absorption amount $Q_{ab}$(W) is generally given by an expression (3) below using n as the number of jointed pairs (a characteristic value of the peltier element 7113), an average Seebeck coefficient S (V/K) of the n and p semiconductor elements, an internal resistance R (Ω) and a coefficient of overall heat transfer K (W/K).

$$Q_{ab}=nST_C I-I^2 R/2-K(T_B-T_C) \quad (3)$$

In the expression (3), I is a current value (A) flown to the peltier element 7113, $T_C$ is a temperature (K) of the heat absorbing surface 7113A and $T_H$ is a temperature (K) of the heat releasing surface 7113B. In other words, the heat absorption amount $Q_{ab}$ is the result obtained by subtracting a Joule loss $I^2 R/2$ and a heat conductivity loss K ($T_H-T_C$) from a heat absorption $nST_C I$ by Peltier effect.

Similarly, the heat releasing amount $Q_D$ (W) can be obtained by an expression (4) below.

$$Q_D=nST_H I-I^2 R/2-K(T_H-T_C)=Q_{ab}+P \quad (4)$$

In the expression (4), P is a power consumption (W) of the peltier element 7113 which is required for equalizing a temperature difference ΔT between the heat absorbing surface 7113A and the heat releasing surface 7113B of the peltier element 7113 to a predetermined temperature difference (ΔT is obtained by subtracting a temperature $T_C$ of the heat absorbing surface 7113A from a temperature $T_H$ of the heat releasing surface 7113B) to a predetermined temperature difference.

In the second exemplary embodiment, the heat absorption amount $Q_{ab}$ and the heat releasing amount $Q_D$ are calculated by setting the temperature $T_C$ of the heat absorbing surface 7113A, the temperature $T_H$ of the heat releasing surface 7113B, the temperature difference ΔT between the heat absorbing surface 7113A and the heat releasing surface 7113B, the current value I to be flown to the peltier element 7113 and the power consumption P of the peltier element 7113 to predetermined values and by using the above-described basic expressions (3) and (4). The surface area $A_1$ of the heat-absorbing-side heat conductive member 7111 and the surface area $A_2$ of the heat-releasing-side heat conductive member 7116 are set such that a relational expression of the expression (2) is satisfied.

The above-described second exemplary embodiment can provide following exemplary advantages in addition to the same advantages to the first exemplary embodiment.

As shown in the expression (4), the heat releasing amount $Q_D$ from the heat releasing surface 7113B is obtained by adding a supplied electric power (the power consumption) P that is provided to the peltier element 7113 to the heat absorption amount $Q_{ab}$ of the heat absorbing surface 7113A. Hence, the heat releasing amount $Q_D$ is larger than the heat absorption amount $Q_{ab}$. Accordingly, for example, when the surface area of the heat-absorbing-side heat conductive member is set larger than that of the heat-releasing-side heat conductive member, it is difficult to appropriately release a comparatively large heat releasing amount $Q_D$ from the heat releasing surface 7113B via the heat-releasing-side heat conductive member to the outside air. In such a case, it is necessary to increase the rotation speed of the cooling fan 714 cooling the heat-releasing-side heat conductive member, which obstructs noise reduction of the projector 1.

In the second exemplary embodiment, since the heat-absorbing-side heat conductive member 7111 and the heat-releasing-side heat conductive member 7116 are adapted to satisfy the relationship of the expression (2), a comparatively large heat releasing amount $Q_D$ can be released from the heat releasing surface 7113B via the heat-releasing-side heat conductive member 7116 to the outside air. Hence, the rotational speed of the cooling fan 714 that cools the heat-releasing-side heat conductive member 7116 needs not be unnecessarily increased, thereby contributing to noise-reduction of the projector 1.

Note that the scope of the invention is not limited to the above-described embodiments but includes modifications, improvements and the like as long as an object of the invention can be achieved.

In the exemplary embodiments, the plurality of heat-absorbing-side fin members 7111B and the plurality of heat-releasing-side fin members 7115B extend orthogonally to each other in plan view. However, the intersecting angle is not limited to 90 degrees as long as the heat-absorbing-side fin members 7111B and the heat-releasing-side fin member 7115B extend in directions intersecting with each other.

In the exemplary embodiments, the stepped block 7112 is interposed between the heat-absorbing-side heat conductive member 7111 and the heat absorbing surface 7113A. However, the arrangement is not limited thereto. The stepped block 7112 may be disposed in a below-described manner, for example.

Figure 23:
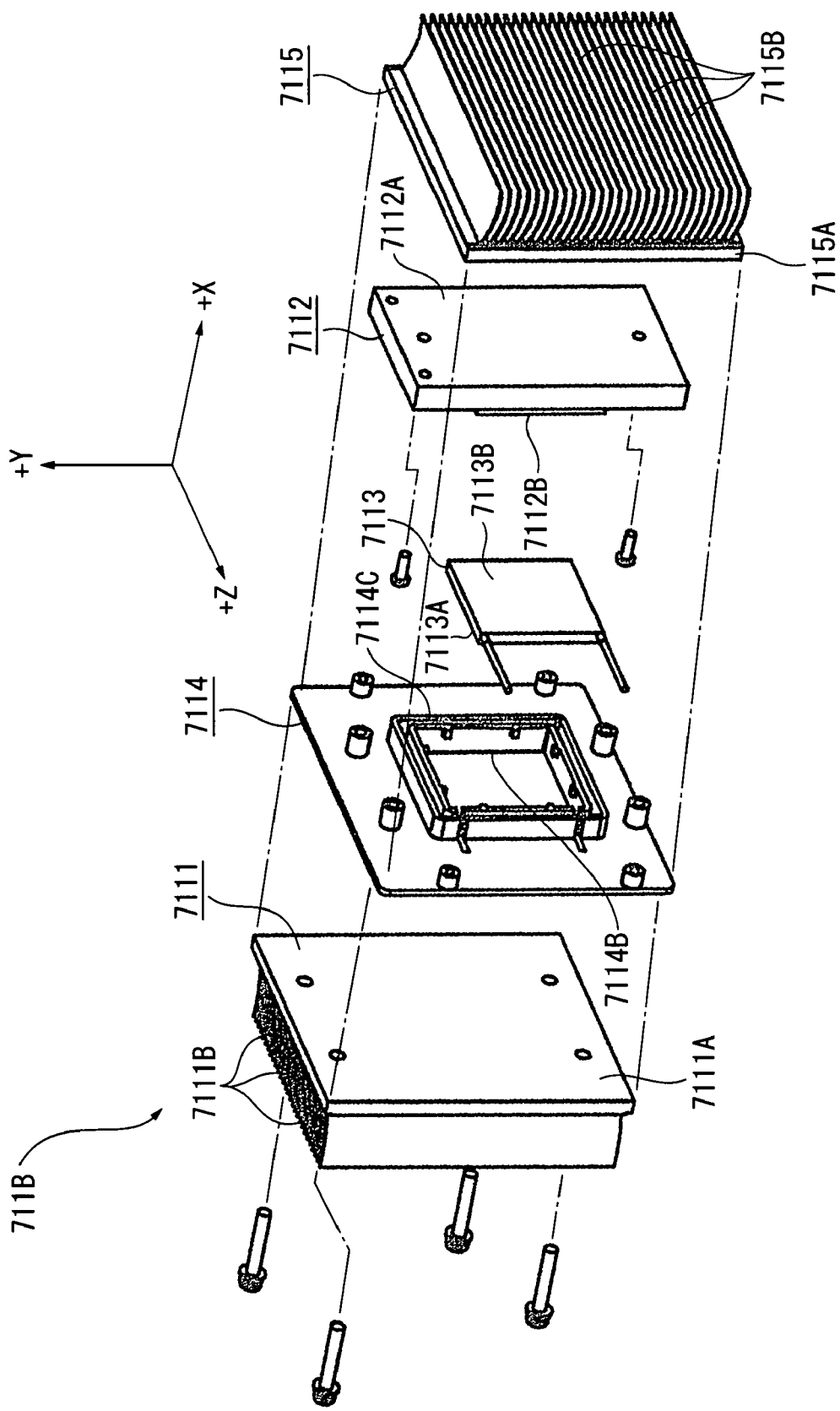
FIG. 23 shows a modification of the first and second exemplary embodiments.
Figure 24:
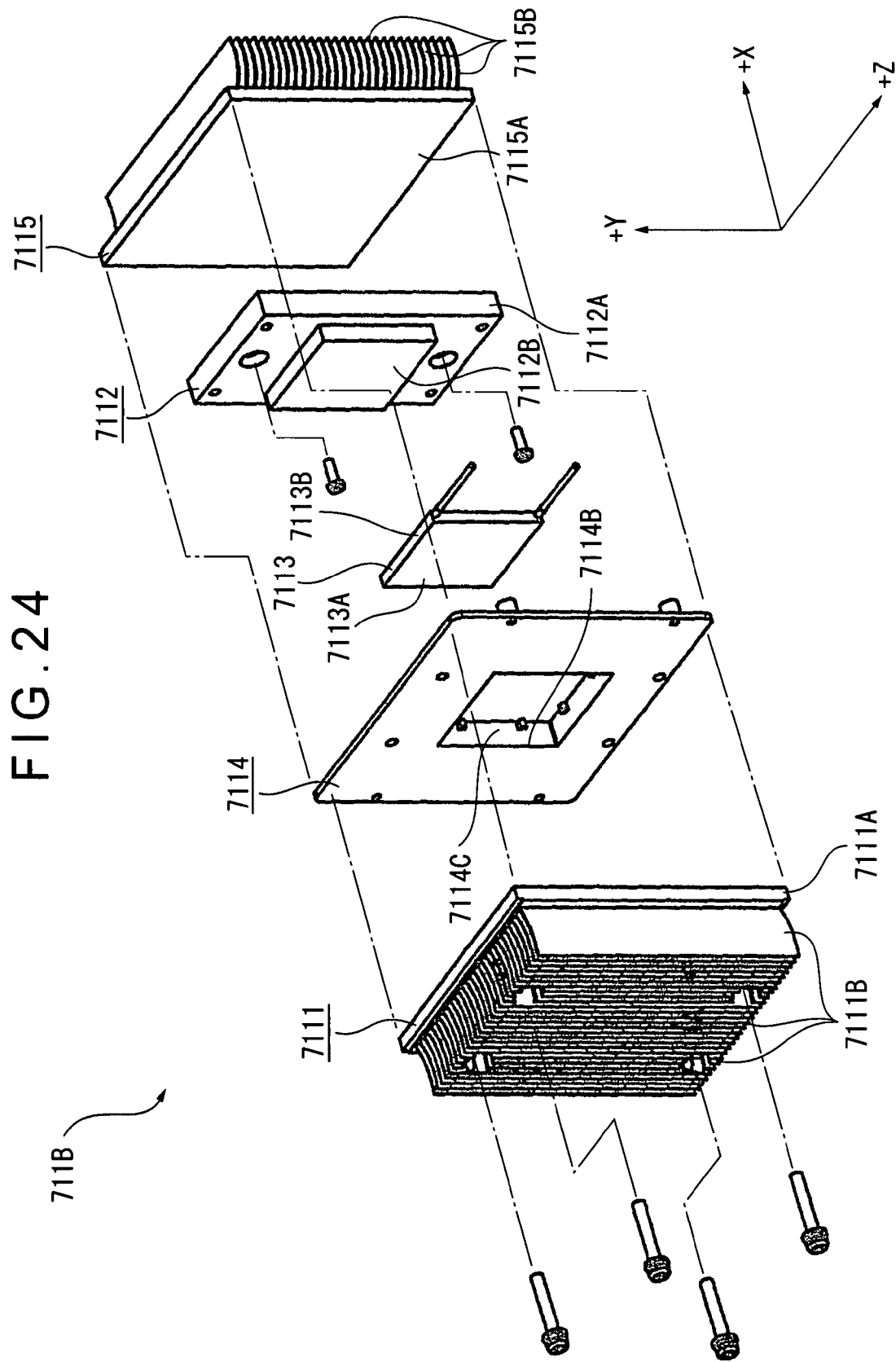
FIG. 24 shows a modification of the first and second exemplary embodiments.

FIG. 23 or 24 is an illustration showing a modification of the exemplary embodiments. Specifically, FIG. 23 is a perspective view of a peltiert unit 711B when seen from the plus X axis direction side. Specifically, FIG. 24 is an exploded perspective view of the peltiert unit 711B when seen from the minus X axis direction side.

Note that FIG. 23 or 24 shows a modification of the first exemplary embodiment. However, the second exemplary embodiment may employ the arrangement shown in FIG. 23 or 24.

For example, an arrangement may be employed in which the heat-absorbing-side heat conductive member 7111, the heat-transfer inhibiting member 7114, the peltier element 7113, the stepped block 7112 and the heat-releasing-side heat conductive member 7115 are disposed so as to be laminated in this order from the projection lens 3 side similarly to the peltier unit 711B shown in FIG. 23 or 24. Specifically, the stepped block 7112 may be interposed between the heat-releasing-side heat conductive member 7115 and the heat releasing surface 7113B.

Herein, the heat-transfer inhibiting member 7114 shown in FIG. 23 or 24 is not provided with the dented portion 7114A. When the peltier unit 711B is assembled, the plate body 7111A and the heat absorbing surface 7113A of the heat-absorbing-side heat conductive member 7111 are heat-conductively connected with each other, the heat releasing surface 7113B and the bulged portion 7112B of the stepped block 7112 are heat-conductively connected with each other, and the block main body 7112A of the stepped block 7112 and the plate body 7115A of the heat-releasing-side heat conductive member 7115 are heat-conductively connected with each other. The heat-transfer inhibiting member 7114 planarly covers the plate body 7111A of the heat-absorbing-side heat conductive member 7111 and the outer end portion of the peltier element 7113. Specifically, in the example shown in FIG. 23 or 24, the heat-transfer inhibiting member 7114 restrains the heat of the stepped block 7112 or the heat-releasing-side heat conductive member 7115 from transferring to the outer end portion of the peltier element 7113 or to the heat-absorbing-side heat conductive member 7111.

Further, as another example, the stepped block 7112 may be provided between the heat-absorbing-side heat conductive member 7111 and the heat absorbing surface 7113A and between the heat releasing surface 7113B and the heat-releasing-side heat conductive member 7115 (7116).

In the second exemplary embodiment, the size of the heat-releasing-side heat conductive member 7116 is changed in order to satisfy the expression (2). However, the arrangement is not limited thereto. The numbers of the plurality of heat-absorbing-side fin members 7111B and the plurality of heat-releasing-side fin members 7115B may be alternatively adjusted.

In the above-described exemplary embodiments, the optical device 45 and the polarization converter 423 are employed as optical components disposed in the sealed structure. However, the arrangement is not limited thereto. Only one of the optical device 45 and the polarization converter 423 may be disposed in the sealed structure, or an optical component other than the optical device 45 and the polarization converter 423 may be alternatively disposed in the sealed structure.

In the above-described exemplary embodiments, the light source device 41 is a discharge optical emission type optical device. However, the arrangement is not limited thereto. A solid light-emitting element such as a laser diode, an LED (Light Emitting Diode), an organic EL (Electro Luminescence) element and a silicon light-emitting element may be alternatively employed.

In the above-described exemplary embodiments, only one light source device 41 is used and the color separating optical system 43 separates light into three colors of light. However, the color separating optical system 43 may be omitted and three solid light-emitting elements each irradiating the three colors of light may be employed as the light source device.

In the above-described exemplary embodiments, the cross dichroic prism 453 is employed as a color-combining optical device. However, the arrangement is not limited thereto. A plurality of dichroic mirrors may be alternatively employed for combining the color light.

In the above-described exemplary embodiments, the projector 1 is a three-panel projector having the three liquid crystal panels 451. However, the arrangement is not limited thereto. A single-panel projector having only one liquid crystal panel may be employed. Alternatively, a projector having two liquid crystal panels or a projector having four or more liquid crystal panels may be employed.

In the above-described exemplary embodiments, the liquid crystal panels are a transmissive type having a light incident surface and a light irradiation surface individually. However, the liquid crystal panels may be a reflection type having a surface serving as both of the light incident surface and the light irradiation surface.

In the above-described exemplary embodiments, the liquid crystal panels are used as an optical modulator. However, the optical modulator may not be liquid crystal.

In the above-described exemplary embodiments, only a front-type projector that projects an image in a direction for observing a screen is exemplified, but an aspect of the invention can be applied to a rear-type projector that projects an image in a direction opposite to the direction for observing the screen.

In the above-described exemplary embodiments, an arrangement in which the cooling device 71 is mounted on the projector is described. However, the arrangement is not limited thereto. The cooling device 71 may be mounted on an electronic device other than the projector, the electronic device including a personal computer.

Although the best mode for implementing an aspect of the invention has been disclosed above, the scope of the invention is not limited thereto. Specifically, although the aspects of the invention have been illustrated and described by taking certain exemplary embodiments as an example, a person skilled in the art can modify the exemplified arrangements in shape, material, quantity and other details without departing from the technical idea and scope of the invention.

Hence, the description containing limitation on shape, material and the like is presented as an example for easy understanding but not intended to limit the invention. Therefore, a description using the names of the components without a part of or all of the limitation on shape, material and the like is also contained in the scope of the invention.

A cooling device of an aspect of the invention can be utilized as a cooling device for a projector that is used for presentation, a home theatre system and the like.

What is claimed is:

1. A cooling device including a thermoelectric conversion element having a heat absorbing surface and a heat releasing surface, comprising:
   a heat-absorbing-side heat conductive member connected with the heat absorbing surface in a heat-conductive manner;
   a heat-releasing-side heat conductive member connected with the heat releasing surface in a heat-conductive manner;
   a plurality of heat-absorbing-side fin members that is disposed to the heat-absorbing-side heat conductive member, protrudes in an out-of-plane direction from an end surface remote from the heat absorbing surface and extends in a predetermined direction; and
   a plurality of heat-releasing-side fin members that is disposed to the heat-releasing-side heat conductive member, protrudes in an out-of-plane direction from an end surface remote from the heat releasing surface and extends in a predetermined direction intersecting with the plurality of heat-absorbing-side fin members in plan view.

2. The cooling device according to claim 1, wherein
   the plurality of heat-releasing-side fin members extends in a predetermined direction orthogonal to the plurality of heat-absorbing-side fin members in plan view.

3. The cooling device according to claim 1, further comprising:
   a spacer that has heat conductive property and is interposed between the heat-absorbing-side heat conductive member and the heat absorbing surface.

4. The cooling device according to claim 3, further comprising:
a heat-transfer inhibiting member that is interposed between the heat-absorbing-side heat conductive member and the heat-releasing-side heat conductive member, the heat-transfer inhibiting member holding the spacer and the thermoelectric conversion element, wherein
the heat-transfer inhibiting member is formed of a material having a heat conductivity equal to or smaller than 0.9 W/(m·K),
the heat-transfer inhibiting member includes: a dented portion that is dented toward a heat-releasing-side heat conductive member side and enables the spacer to be accommodated; and an opening portion that is formed in a bottom surface portion of the dented portion and enables the thermoelectric conversion element to be accommodated, and
the dented portion is formed so as to cover outer end portions of the spacer and the thermoelectric conversion element.

5. The cooling device according to claim 1, further comprising:
a heat-absorbing-side duct that encloses the plurality of heat-absorbing-side fin members, extends in an extending direction of the plurality of heat-absorbing-side fin members and enables air to flow in the extending direction, wherein
the heat-absorbing-side duct is formed of a material having a heat conductivity equal to or smaller than 0.9 W/(m·K).

6. The cooling device according to claim 1, further comprising:
a heat-releasing-side duct that encloses the plurality of heat-releasing-side fin members, extends in an extending direction of the plurality of heat-releasing-side fin members and enables air to flow in the extending direction, wherein
the heat-releasing-side duct is formed of a material having a heat conductivity equal to or larger than 42 W/(m·K).

7. The cooling device according to claim 1, wherein
the heat-absorbing-side heat conductive member and the heat-releasing-side heat conductive member satisfy a relationship of $A_1:A_2=Q_{ab}:Q_D$, where:
$A_1$ is a surface area of the heat-absorbing-side heat conductive member;
$A_2$ is a surface area of the heat-releasing-side heat conductive member;
$Q_{ab}$ is a heat absorption amount of the thermoelectric conversion element; and
$Q_D$ is a heat absorption amount of the thermoelectric conversion element.

8. The cooling device according to claim 1, further comprising:
a cooling fan that is disposed so as to face the heat-releasing-side heat conductive member and sends air to the plurality of heat-releasing-side fin members, wherein
the cooling fan is an axial-flow fan that sucks and ejects air in a direction of a fan rotation axis, and
the fan rotation axis is displaced relative to a center position of the thermoelectric conversion element in plan view.

9. A projector, comprising:
an optical component disposed in a sealed structure having a ringed air flow passage for circulating air; and
a circulation fan for circulating the air in the ringed air flow passage, wherein
the sealed structure includes an optical component casing, a plurality of duct portions and a cooling device,
the optical component casing accommodates the optical component and has an air inlet for taking air inside and an air outlet for exhausting the air to the outside,
the plurality of duct members introduces air into the optical component casing through the air inlet and re-introduces the air that is exhausted from the optical component casing through the air outlet to the outside into the optical component casing through the air inlet,
the cooling device includes: a thermoelectric conversion element; a heat-absorbing-side heat conductive member; and a heat-releasing-side heat conductive member,
the thermoelectric conversion element has a heat absorbing surface and a heat releasing surface,
the heat-absorbing-side heat conductive member is connected with the heat absorbing surface in a heat-conductive manner,
the heat-absorbing-side heat conductive member has a plurality of heat-absorbing-side fin members that protrudes in an out-of-plane direction from an end surface remote from the heat absorbing surface and extends in a predetermined direction,
the heat-releasing-side heat conductive member is connected with the heat releasing surface in a heat-conductive manner,
the heat-releasing-side heat conductive member has a plurality of heat-releasing-side fin members that protrudes in an out-of-plane direction from an end surface remote from the heat releasing surface and extends in a predetermined direction,
the heat absorbing surface of the thermoelectric conversion element faces the inside of the sealed structure, and
the heat releasing surface of the thermoelectric conversion element faces the outside of the sealed structure.

10. The projector according to claim 9, wherein
the plurality of heat-releasing-side fin members extends in a predetermined direction orthogonal to the plurality of heat-absorbing-side fin members in plan view.

11. The projector according to claim 9, further comprising:
a spacer that has heat conductive property and is interposed between the heat-absorbing-side heat conductive member and the heat absorbing surface.

12. The projector according to claim 11, further comprising:
a heat-transfer inhibiting member that is interposed between the heat-absorbing-side heat conductive member and the heat-releasing-side heat conductive member, the heat-transfer inhibiting member holding the spacer and the thermoelectric conversion element, wherein
the heat-transfer inhibiting member is formed of a material having a heat conductivity equal to or smaller than 0.9 W/(m·K),
the heat-transfer inhibiting member includes: a dented portion that is dented toward a heat-releasing-side heat conductive member side and enables the spacer to be accommodated; and an opening portion that is formed in a bottom surface portion of the dented portion and enables the thermoelectric conversion element to be accommodated, and
the dented portion is formed so as to cover outer end portions of the spacer and the thermoelectric conversion element.

13. The projector according to claim 9, further comprising:
a heat-absorbing-side duct that encloses the plurality of heat-absorbing-side fin members, extends in an extending direction of the plurality of heat-absorbing-side fin members and enables air to flow in the extending direction, wherein the heat-absorbing-side duct is formed of a material having a heat conductivity equal to or smaller than 0.9 W/(m·K).

14. The projector according to claim 9, further comprising:
a heat-releasing-side duct that encloses the plurality of heat-releasing-side fin members, extends in an extending direction of the plurality of heat-releasing-side fin members and enables air to flow in the extending direction, wherein
the heat-releasing-side duct is formed of a material having a heat conductivity equal to or larger than 42 W/(m·K).

15. The projector according to claim 9, wherein
the heat-absorbing-side heat conductive member and the heat-releasing-side heat conductive member satisfy a relationship of $A_1:A_2=Q_{ab}:Q_D$, where:
$A_1$ is a surface area of the heat-absorbing-side heat conductive member;
$A_2$ is a surface area of the heat-releasing-side heat conductive member;
$Q_{ab}$ is a heat absorption amount of the thermoelectric conversion element; and
$Q_D$ is a heat absorption amount of the thermoelectric conversion element.

16. The projector according to claim 9, further comprising:
a cooling fan that is disposed so as to face the heat-releasing-side heat conductive member and sends air to the plurality of heat-releasing-side fin members, wherein
the cooling fan is an axial-flow fan that sucks and ejects air in a direction of a fan rotation axis, and
the fan rotation axis is displaced relative to a center position of the thermoelectric conversion element in plan view.

* * * * *